US012802178B2

(12) United States Patent
Kobayashi

(10) Patent No.: US 12,802,178 B2
(45) Date of Patent: Nov. 17, 2026

(54) IMAGE PROCESSING APPARATUS, RADIATION IMAGING SYSTEM, METHOD OF OPERATING IMAGE PROCESSING APPARATUS, AND COMPUTER-READABLE STORAGE MEDIUM

(71) Applicant: CANON KABUSHIKI KAISHA, Tokyo (JP)

(72) Inventor: Tsuyoshi Kobayashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 257 days.

(21) Appl. No.: 18/665,669

(22) Filed: May 16, 2024

(65) Prior Publication Data

US 2024/0394849 A1 Nov. 28, 2024

(30) Foreign Application Priority Data

May 24, 2023 (JP) ................................. 2023-085338

(51) Int. Cl.

| | |
|---|---|
| ***G06T 5/70*** | (2024.01) |
| ***G06T 3/4053*** | (2024.01) |
| ***G06T 5/92*** | (2024.01) |

(52) U.S. Cl.

CPC .............. *G06T 5/70* (2024.01); *G06T 3/4053* (2013.01); *G06T 5/92* (2024.01)

(58) Field of Classification Search

CPC .......... G06T 5/70; G06T 3/4053; G06T 5/92; G06T 2207/10116; G06T 2207/20081; G06T 2207/20084; G06T 2207/30008; G06T 5/60

See application file for complete search history.

(56) References Cited

U.S. PATENT DOCUMENTS

| | | | | |
|---|---|---|---|---|
| 9,418,417 | B2 | 8/2016 | Kobayashi | |
| 9,813,647 | B2 | 11/2017 | Kobayashi | |
| 9,979,911 | B2 | 5/2018 | Kobayashi | |
| 11,295,158 | B2 | 4/2022 | Kobayashi | |
| 2021/0365722 | A1* | 11/2021 | Masuda | G06F 18/285 |
| 2022/0058423 | A1 | 2/2022 | Kobayashi | |

(Continued)

FOREIGN PATENT DOCUMENTS

JP 2013-048782 A 3/2013

OTHER PUBLICATIONS

Tassano, M. et al., "FastDVDnet: Towards Real-Time Deep Video Denoising Without Flow Estimation" IEEE/CVF Conference on Computer Vision and Pattern Recognition (CVPR) (Apr. 2020) pp. 1354-1363.

*Primary Examiner* — Jennifer Mehmood
*Assistant Examiner* — Vaisali Rao Koppolu
(74) *Attorney, Agent, or Firm* — Carter, DeLuca & Farrell LLP

(57) ABSTRACT

An image processing apparatus configured to apply image processing to a moving image including a plurality of frames of radiation images is provided that includes: a selecting unit configured to select a learned model used for the image processing of a frame to be processed from among a plurality of learned models which differ in the number of frames to be input, based on the number of frames which have been obtained; and an inference processing unit configured to perform inference processing using the selected learned model in the image processing of the frame to be processed.

13 Claims, 15 Drawing Sheets

(56) References Cited

U.S. PATENT DOCUMENTS

| | | | | |
|---|---|---|---|---|
| 2022/0175331 | A1 | 6/2022 | Kobayashi | |
| 2022/0180512 | A1* | 6/2022 | Oh | G06N 3/084 |
| 2022/0301718 | A1* | 9/2022 | Paravastu | A61B 5/7267 |
| 2022/0346885 | A1* | 11/2022 | Kunio | A61B 34/20 |
| 2023/0110665 | A1* | 4/2023 | Tsukagoshi | G06T 3/4046<br>382/298 |
| 2023/0206404 | A1 | 6/2023 | Kobayashi | |

* cited by examiner

FIG. 5A

CURRENT FRAME NUMBER t

| CNN INPUT FRAME | 0 | 1 | 2 | 3 | 4 | 5 | 6 | 7 | 8 | 9 | 10 |
|---|---|---|---|---|---|---|---|---|---|---|---|
| t-9 | | | | | | | | | | 0 | 1 |
| t-8 | | | | | | | | | 0 | 1 | 2 |
| t-7 | | | | | | | | 0 | 1 | 2 | 3 |
| t-6 | | | | | | | 0 | 1 | 2 | 3 | 4 |
| t-5 | | | | | | 0 | 1 | 2 | 3 | 4 | 5 |
| t-4 | | | | | 0 | 1 | 2 | 3 | 4 | 5 | 6 |
| t-3 | | | | 0 | 1 | 2 | 3 | 4 | 5 | 6 | 7 |
| t-2 | | | 0 | 1 | 2 | 3 | 4 | 5 | 6 | 7 | 8 |
| t-1 | | 0 | 1 | 2 | 3 | 4 | 5 | 6 | 7 | 8 | 9 |
| L | 0 | 1 | 2 | 3 | 4 | 5 | 6 | 7 | 8 | 9 | 10 |

FIG. 5B

CURRENT FRAME NUMBER t=5

| CNN INPUT FRAME | CASE 2 | CASE 1 |
|---|---|---|
| t-9 | -4 | 0 |
| t-8 | -3 | 0 |
| t-7 | -2 | 0 |
| t-6 | -1 | 0 |
| t-5 | 0 | 0 |
| t-4 | 1 | 1 |
| t-3 | 2 | 2 |
| t-2 | 3 | 3 |
| t-1 | 4 | 4 |
| L | 5 | 5 |

IMAGE PROCESSING APPARATUS, RADIATION IMAGING SYSTEM, METHOD OF OPERATING IMAGE PROCESSING APPARATUS, AND COMPUTER-READABLE STORAGE MEDIUM

BACKGROUND OF THE INVENTION

Field of the Invention

The present invention relates to an image processing apparatus, a radiation imaging system, a method of operating the image processing apparatus, and a computer-readable storage medium.

Description of the Related Art

Recently, a radiation imaging system including a detecting unit for detecting radiation such as X-ray has been widely used in fields of industry, medicine, etc. Especially, in the field of X-ray movie imaging, a digital radiation imaging system which converts incident X-rays into visible light by a scintillator and obtains a moving image using a semiconductor sensor is widely spread. Here, the moving image (movie) refers to a set of a plurality of still images collected continuously, and each still image in the moving image is hereinafter referred to as a frame.

In the radiation imaging system, various image processing is applied to images obtained using the semiconductor sensors to enhance diagnostic value. The image processing includes the noise reduction processing as an example. In a series of imaging processes, various noises such as quantum noise caused by fluctuations in the X-ray quanta and system noise generated from detectors, circuits, and the like are generated and superimposed on images. Due to this phenomenon, the granularity of the obtained moving image may deteriorate, and the diagnostic performance may be degraded. In particular, in the X-ray movie imaging for medical use, it is recommended to perform imaging with less X-ray dose from the viewpoint of exposure to a subject. Therefore, it is important to improve the image quality by applying image processing for suitably reducing noise to the captured image in order to improve the diagnostic performance.

In this regard, Japanese Patent Application Laid-Open No. 2013-48782 proposes a rule-based technique in which a rule for accurately determining motion from a moving image is made in consideration of the influence of noise, and suitable noise reduction are performed by performing weighted addition of a plurality of frames of moving image in the time series according to the result of the determination. In recent years, noise reduction processing with higher performance has been put into practical use by applying machine learning based techniques such as deep learning. For example, "FastDVDnet: Towards Real-Time Deep Video Denoising Without Flow Estimation," M Tassano, et. al, IEEE/CVF Conference on Computer Vision and Pattern Recognition (CVPR), 2020, pp. 1354~1363 proposes a technique to obtain a noise reduced image by using a learned neural network to which the frames before and after a frame to be reduced noise are input.

However, the aforementioned conventional techniques may have the following problems. According to Japanese Patent Application Laid-Open No. 2013-48782, by combining rule-based motion detection and a recursive filter, it is possible to perform the weighted addition by combining temporal and spatial information using an image of a frame obtained prior to the current frame (hereinafter referred to as past frame). However, in the rule-based motion detection processing, it is difficult to create an appropriate rule for every case of various object structures included in the captured image, and an afterimage may occur due to the noise reduction.

Further, according to "FastDVDnet: Towards Real-Time Deep Video Denoising Without Flow Estimation", it is possible to obtain a good noise reduction effect by processing applying the machine learning based technology. However, since a plurality of frames need to be input to the neural network in the configuration described in "FastDVDnet: Towards Real-Time Deep Video Denoising Without Flow Estimation", it is a problem that suitable processing cannot be performed until all frames are obtained. Further, in the configuration described in "FastDVDnet: Towards Real-Time Deep Video Denoising Without Flow Estimation", in addition to the current frame, it is necessary to input a past frame and a future frame later than the current frame. Therefore, it is difficult to perform processing to display the result of processing on the current frame after obtaining the current frame but before obtaining the next frame (hereinafter referred to as real-time processing).

In the X-ray movie imaging for the medical use, from the viewpoint of exposure to the subject, it is desired that all imaged frames are output as images, and it is required to have a configuration that does not cause an invalid exposure. Further, in order to perform the medical treatment promptly, it is required to provide an image to which image processing such as the noise reduction is suitably applied by real-time processing even when only one frame immediately after imaging is available.

One embodiment according to the present disclosure has been made in view of the above problems, and one of the purposes of the present disclosure is to provide an image processing apparatus which can apply image processing to a moving image suitably and in real-time even immediately after imaging.

SUMMARY OF THE INVENTION

A image processing apparatus according to one embodiment of the present disclosure is an image processing apparatus that applies image processing to a moving image including a plurality of frames of radiation images, the image processing apparatus comprising: a selecting unit that selects a learned model used for the image processing of a frame to be processed from among a plurality of learned models which differ in the number of frames to be input, based on the number of frames which have been obtained; and an inference processing unit that performs inference processing using the selected learned model in the image processing of the frame to be processed.

Further features of the present invention will become apparent from the following description of exemplary embodiments with reference to the attached drawings.

BRIEF DESCRIPTION OF THE DRAWINGS

FIG. 5A is a table for explaining the operation of the radiation imaging system and the noise reduction processing unit according to the first embodiment.

FIG. 5B is a table for explaining the operation of the radiation imaging system and the noise reduction processing unit according to the first embodiment.

DESCRIPTION OF THE EMBODIMENTS

Figure 1A:
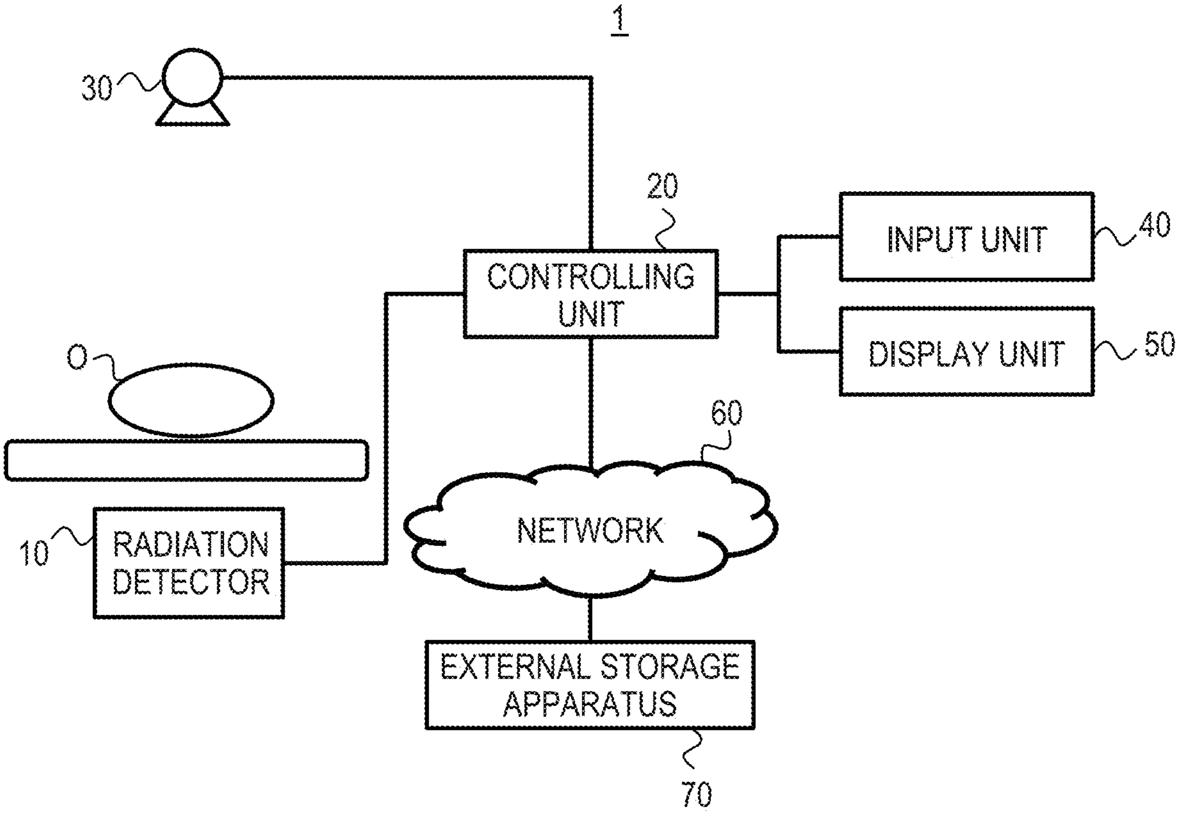
FIG. 1A is a diagram for illustrating an example of a schematic configuration of a radiation imaging system according to a first embodiment.

Preferred embodiments of the present invention will now be described in detail in accordance with the accompanying drawings. However, the dimensions, materials, shapes, and relative positions of the components, and the like described in the following embodiments can be freely set and may be modified depending on the configuration of an apparatus to which the present disclosure is applied or various conditions. In the drawings, the same reference numerals are used to indicate elements that are identical or functionally similar.

The radiation imaging system using X-rays as an example of radiation will be described below. However, the radiation may be X-ray or other radiation. In the following embodiment, the term "radiation" may include, for example, electromagnetic radiation such as X-rays and y-rays, and particle radiation such as a-rays, B-rays, particle rays, proton rays, heavy ion rays, and meson rays.

In the following, a machine learning model refers to a learning model based on the machine learning algorithm. Specific algorithms of the machine learning include the nearest neighbor method, the naive Bayes method, the decision tree, and the support vector machine. The neural networks and the deep learning may also be used. One of the above algorithms can be freely used to apply the following embodiments and modifications. Training data refers to a data set used for the training of the machine learning model, and includes a pair of input data which is input to the machine learning model and ground truth (teacher data) which is the correct answer of the output result of the machine learning model.

The learned model refers to a model which has been performed training on a machine learning model according to any machine learning algorithm such as deep learning using an appropriate training data in advance. The learned model has been obtained by training using an appropriate training data in advance, however the learned model is not a model which does not perform further training, and the incremental learning may be performed on the learned model. The incremental learning may be performed even after the apparatus has been installed at the place of use.

First Embodiment (Configuration of a Radiation Imaging System)

Hereinafter, with reference to FIG. 1A and FIG. 1B, a radiation imaging system, an image processing apparatus, and an operation method of the image processing apparatus according to a first embodiment of the present disclosure will be described. FIG. 1A is a diagram for illustrating an example of a schematic configuration of the radiation imaging system 1 according to the first embodiment. The object to be inspected O is described as a human body in the following description. However, the object to be inspected O imaged by the radiation imaging system according to the present disclosure is not limited to a human body, and may be other animals, plants, or objects subject to the non-destructive inspection.

The radiation imaging system 1 according to the first embodiment includes a radiation detector 10, a controlling unit 20, a radiation generator 30, an input unit 40, and a display unit 50. The radiation imaging system 1 may include an external storage apparatus 70 such as a server connected to the controlling unit 20 via a network 60 such as the Internet or an intranet.

The radiation generator 30 may, for example, include a radiation source such as an X-ray tube and irradiate radiation. The radiation detector 10 may detect the radiation irradiated from the radiation generator 30 and generate a radiation image corresponding to the detected radiation. Therefore, the radiation detector 10 may generate a radiation image of the object to be inspected O by detecting radiation irradiated from the radiation generator 30 and transmitting through the object to be inspected O.

Figure 1B:
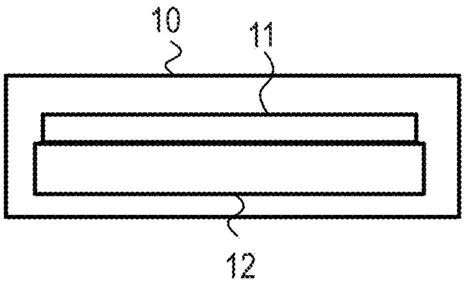
FIG. 1B is a diagram for illustrating an example of a schematic configuration of a radiation detector according to the first embodiment.

FIG. 1B is a diagram for illustrating an example of a schematic configuration of the radiation detector 10 according to the first embodiment. The radiation detector 10 includes a scintillator 11 and an imaging sensor 12. The scintillator 11 converts the radiation incident on the radiation detector 10 into light of a wavelength detectable by the imaging sensor 12. The scintillator 11 may include, for example, CsI or GOS ($GD_2O_2S$). The imaging sensor 12 may include, for example, a photoelectric conversion element composed of a-Si or crystalline Si, detect the light corresponding to the radiation converted by the scintillator 11, and output a signal corresponding to the detected light. The radiation detector 10 may generate the radiation image by performing the A/D conversion or the like on the signal output by the imaging sensor 12.

Although not shown in FIG. 1B, the radiation detector 10 may include a calculating unit, an A/D conversion unit, and the like. A grid may be installed between the radiation detector 10 and the object to be inspected O to reduce scattered radiation generated when the radiation passes the object to be inspected O and reaching the radiation detector 10.

The controlling unit 20 is connected to the radiation detector 10, the radiation generator 30, the input unit 40, and the display unit 50. The controlling unit 20 can obtain the radiation image output from the radiation detector 10, perform image processing on the radiation image, and control the driving of the radiation detector 10 and the radiation generator 30. Thus, the controlling unit 20 can control the radiation generator 30 to generate the radiation with a predetermined imaging-condition at an appropriate timing, and can perform movie imaging at a desired frame rate. The controlling unit 20 can function as an example of an image processing apparatus. The controlling unit 20 may be connected to the external storage apparatus 70 via any networks 60 such as the Internet or an intranet, and may obtain a radiation image or the like from the external storage apparatus 70. Further, the controlling unit 20 may be connected to other radiation detector, radiation generator, or the like via the network 60. The controlling unit 20 may be connected to the external storage apparatus 70 or the like in a wired manner or in a wireless manner.

The input unit 40 includes an input device such as a mouse, keyboard, trackball, touch panel, etc., and can input an instruction to the controlling unit 20 by being operated by an operator. The display unit 50 includes for example any monitor, and can display information and images output from the controlling unit 20 and information input by the input unit 40.

In the first embodiment, the controlling unit 20, the input unit 40, the display unit 50, and the like are configured by separate devices, but they may be integrally configured. For example, the input unit 40 and the display unit 50 may be configured by a touch panel display. In the first embodiment, an image processing apparatus is configured by the controlling unit 20, but the image processing apparatus may obtain the radiation image and perform the image processing on the radiation image, and may not control the drive of the radiation detector 10 and the radiation generator 30.

The controlling unit 20, the radiation detector 10, the radiation generator 30, and the like may be connected in a wired manner or in a wireless manner. Further, the external storage apparatus 70 may constitute an imaging system such as a picture archiving and communication systems (PACS) in a hospital, or may be a server or the like outside a hospital.

(Configuration of a Controlling Unit)

Figure 2A:
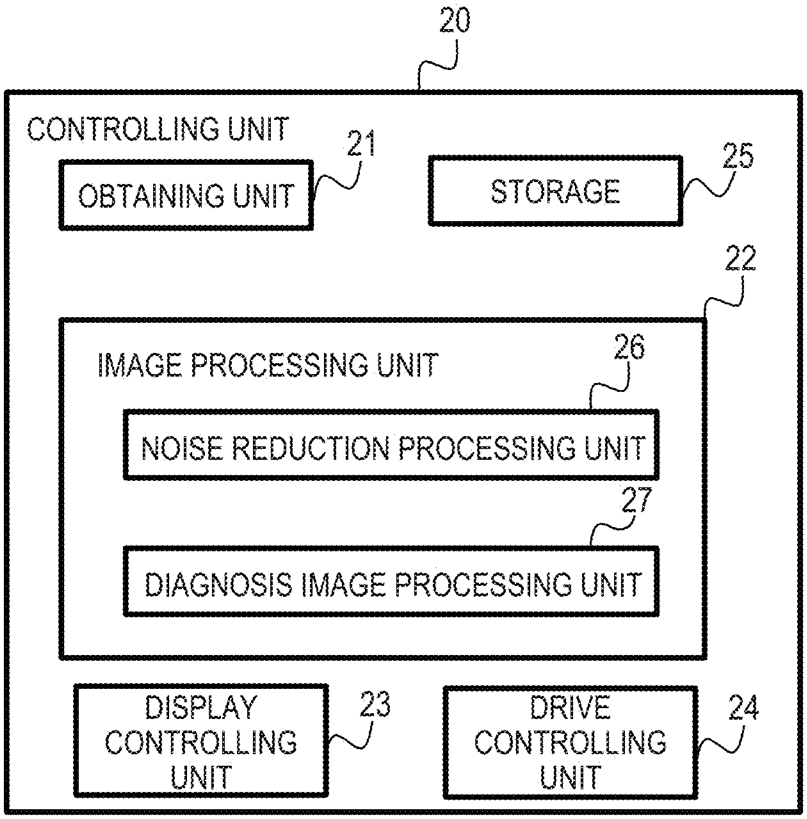
FIG. 2A is a diagram for illustrating an example of a schematic configuration of a controlling unit according to the first embodiment.
Figure 2B:
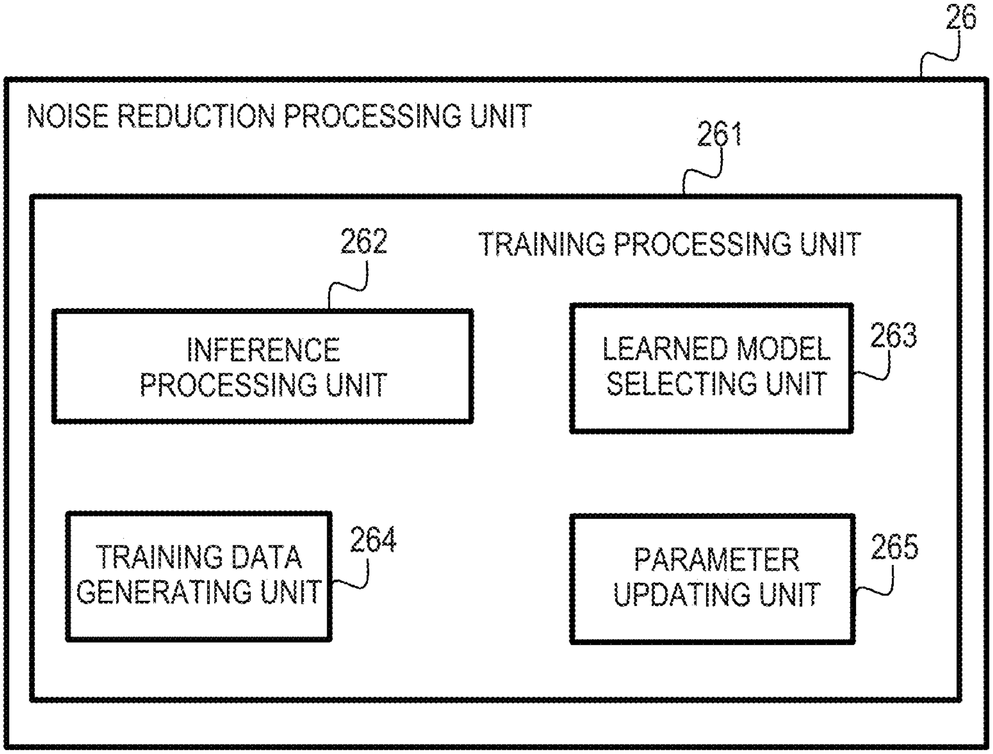
FIG. 2B is a diagram for illustrating an example of a schematic configuration of a noise reduction processing unit according to the first embodiment.

Next, a more specific configuration of the controlling unit 20 will be described with reference to FIG. 2A and FIG. 2B. FIG. 2A is a diagram for illustrating an example of a schematic configuration of the controlling unit 20 according to the first embodiment, and FIG. 2B is a diagram for illustrating an example of a schematic configuration of a noise reduction processing unit 26 according to the first embodiment. The controlling unit 20 includes an obtaining unit 21, an image processing unit 22, a display controlling unit 23, a drive controlling unit 24, and a storage 25.

The obtaining unit 21 can obtain the radiation image output by the radiation detector 10, various information input by the input unit 40, and the like. The obtaining unit 21 can also obtain the radiation image, patient information, and the like from the external storage apparatus 70 and the like.

The image processing unit 22 includes a noise reduction processing unit 26 and a diagnosis image processing unit 27, and can perform image processing according to the present disclosure on the radiation image obtained by the obtaining unit 21. In the first embodiment, noise reduction processing will be described as an example of the image processing performed by the image processing unit 22.

As shown in FIG. 2B, the noise reduction processing unit 26 includes a training processing unit 261 and an inference processing unit 262. The training processing unit 261 includes a training data generating unit 264 and a parameter updating unit 265, in addition to the configuration of the inference processing unit 262 and a learned model selecting unit 263. With this configuration, the noise reduction processing unit 26 can perform training of a machine learning model for performing the noise reduction processing, and can apply the noise reduction processing suitable for the radiation image using the machine learning model.

Further, the diagnosis image processing unit 27 can perform diagnostic image processing for converting an image subjected to the noise reduction by the noise reduction processing unit 26 into an image suitable for diagnosis. The diagnostic image processing includes, for example, gradation processing for adjusting the gradation of the image, emphasis processing for emphasizing a specific pixel in the image, and grid stripe reduction processing for reducing grid stripe in the image. The diagnosis image processing unit 27 may perform, for example, the gradation processing, the emphasis processing, the grid stripe reduction processing, or the like in accordance with a region of interest (ROI) set in the radiation image. For example, the gradation processing may be performed so that the gradation of the region of interest is widened, and the emphasis processing may be performed so as to emphasize the region of interest. The region of interest may be set according to an instruction from the operator, or may be set based on an imaged site, disease name information, finding information, etc.

Next, a configuration of the training processing unit 261 will be described. The training processing unit 261 performs training processing applied to training of the machine learning model, and includes configurations of the inference processing unit 262 and the learned model selecting unit 263, as well as the training data generating unit 264 and the parameter updating unit 265.

When the training processing is performed, an image is input to the training processing unit 261, and training data is created by the training data generating unit 264. Here, a configuration example using a set of training data for training the noise reduction processing is described, the set of training data including an image added with artificial noise as input data and an image not added with the artificial noise as ground truth. The training data generating unit 264 performs processing to create a set of training data by adding an artificial noise created by simulating the characteristics of a radiation image to the input image. Here, the noise added by the training data generating unit 264 reflects noise amount calculated by the training data generating unit 264, which may vary due to manufacturing variations. Details of the artificial noise to be added will be described later.

The parameter updating unit 265 performs a process of updating the parameters of the machine learning model of the inference processing unit 262 based on the ground truth and a calculation result of the inference processing unit 262 with regard to the input data.

The inference processing unit 262 infers and generates an image which is generated by applying the image processing to the radiation image by using the radiation image as an input of the learned model which is obtained by performing the training using the training data as described above. The learned model selecting unit 263 selects a learned model used by the inference processing unit 262. Details of the selection of the learned model by the learned model selecting unit 263 will be described later.

Here, the training processing unit 261 may not be included in the controlling unit 20. For example, the configuration of the training processing unit 261 other than the inference processing unit 262 and the learned model selecting unit 263 may be configured on hardware different from the controlling unit 20 such as a server, and learned model may be created by performing training in advance using an appropriate training data. In this case, in the controlling unit 20, the inference processing unit 262 may access the other hardware and perform only processing using the learned model. In addition, a learned model which is created in advance may be provided in the noise reduction processing unit 26 and the inference processing unit 262 may use the provided learned model. Alternatively, by including the training processing unit 261 in the controlling unit 20, the incremental learning may be performed using training data obtained after installation.

The display controlling unit 23 can control the display of the display unit 50, and cause the display unit 50 to display the radiation image before and after the image processing performed by the image processing unit 22, the patient information, and the like. The drive controlling unit 24 can control the drive of the radiation detector 10, the radiation generator 30, etc. Therefore, the controlling unit 20 can control the imaging of radiation image by controlling the drive of the radiation detector 10 and the radiation generator 30 by the drive controlling unit 24.

The storage 25 can store programs for realizing various application software including an operating system (OS), device drivers for peripheral devices, and programs for performing processing described later and the like. The storage 25 can also store information obtained by the obtaining unit 21, the radiation image on which the imaging processing is performed by the image processing unit 22, and the like. For example, the storage 25 can store the radiation image obtained by the obtaining unit 21, and the radiation image on which the noise reduction processing described later is performed.

The controlling unit 20 can be configured using a general computer including a processor, a memory, or the like, but may be configured as a dedicated computer for the radiation imaging system 1. Here, the controlling unit 20 functions as an example of an image processing apparatus according to the first embodiment, but the image processing apparatus according to the first embodiment may be a separate (external) computer communicably connected to the controlling unit 20. The controlling unit 20 or the image processing apparatus may be, for example, a personal computer, and a desktop PC, notebook PC, or tablet PC (portable information terminal) may be used. The processor may be a central processing unit (CPU). The processor may be, for example, a micro processing unit (MPU), a graphical processing unit (GPU), a field-programmable gate array (FPGA), or the like.

Each function of the controlling unit 20 may be implemented by a processor such as a CPU or MPU executing a software module stored in the storage 25. The processor may be, for example, a GPU or an FPGA. Each function may be configured by a circuit or the like that performs a specific function such as an application specific integrated circuit (ASIC). For example, the image processing unit 22 may be implemented using dedicated hardware such as an ASIC, or the display controlling unit 23 may be implemented using a dedicated processor such as a GPU that is different from the CPU. The storage 25 may be configured with any storage medium, for example, an optical disk such as a hard disk or a memory.

(Configuration of a Machine Learning Model)

Next, with reference to FIG. 3A to FIG. 3C, an example of a machine learning model constituting a learning model according to the first embodiment will be described. An example of a machine learning model used by the inference processing unit 262 according to the first embodiment is a multi-layer neural network.

Figure 3A:
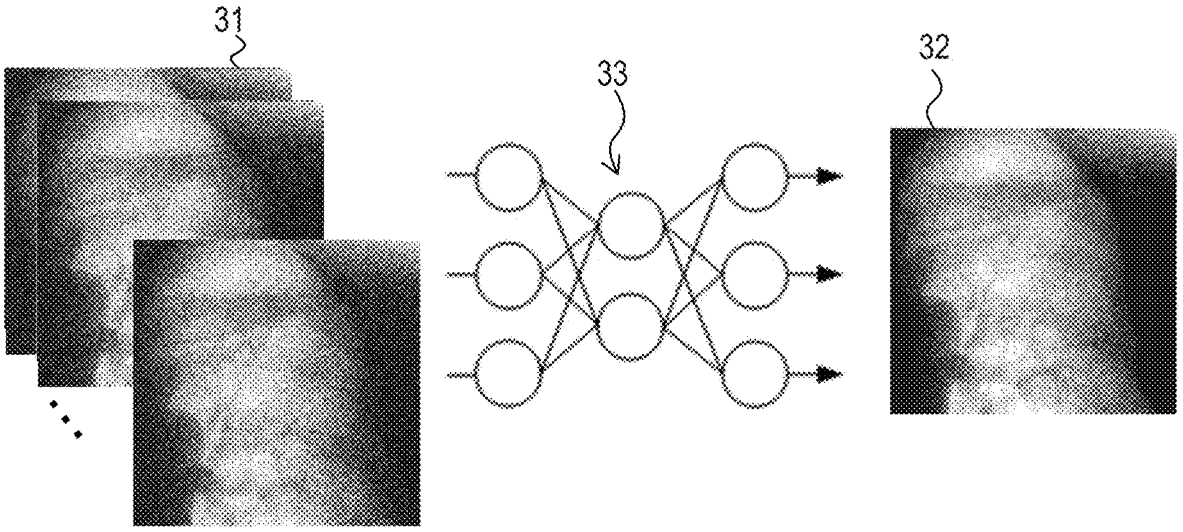
FIG. 3A is a diagram for illustrating an example of a schematic configuration of a learned model according to the first embodiment.

FIG. 3A is a diagram for illustrating a schematic configuration example of the neural network model according to the first embodiment. The configuration 33 of the neural network model shown in FIG. 3A is designed to output inferred data 32 in which noise is reduced in accordance with a tendency trained in advance, with regard to input data 31. The output inferred data 32 in which noise is reduced is based on training content of the machine learning process, and the neural network according to the first embodiment has learned a characteristic amount for separating noise from signals contained in the input radiation image. In the example shown in FIG. 3A, the input data 31 is a current frame and one or more frames which are imaged prior to the current frame (i.e., imaged in the past), and the inferred data 32 in which the noise is reduced is a frame in which the noise of the current frame is reduced. It is also possible to use one current frame as the input data 31 to configure a learned model in which the number of input frames is one.

For example, a convolutional neural network (CNN) can be used for at least a part of the multilayer neural network. In addition, technique relating to an autoencoder may be used for at least a part of the multilayer neural network.

Here, a case where the CNN is used as a machine learning model for the noise reduction processing of the radiation image will be described. FIG. 3B is a diagram for illustrating an example of a schematic configuration 33 of the CNN constituting the neural network model according to the first embodiment. In the example of the learned model according to the first embodiment, if the input data 31, which is a radiation image, is input, a radiation image with reduced noise can be output as the inferred data 32.

Figure 3B:
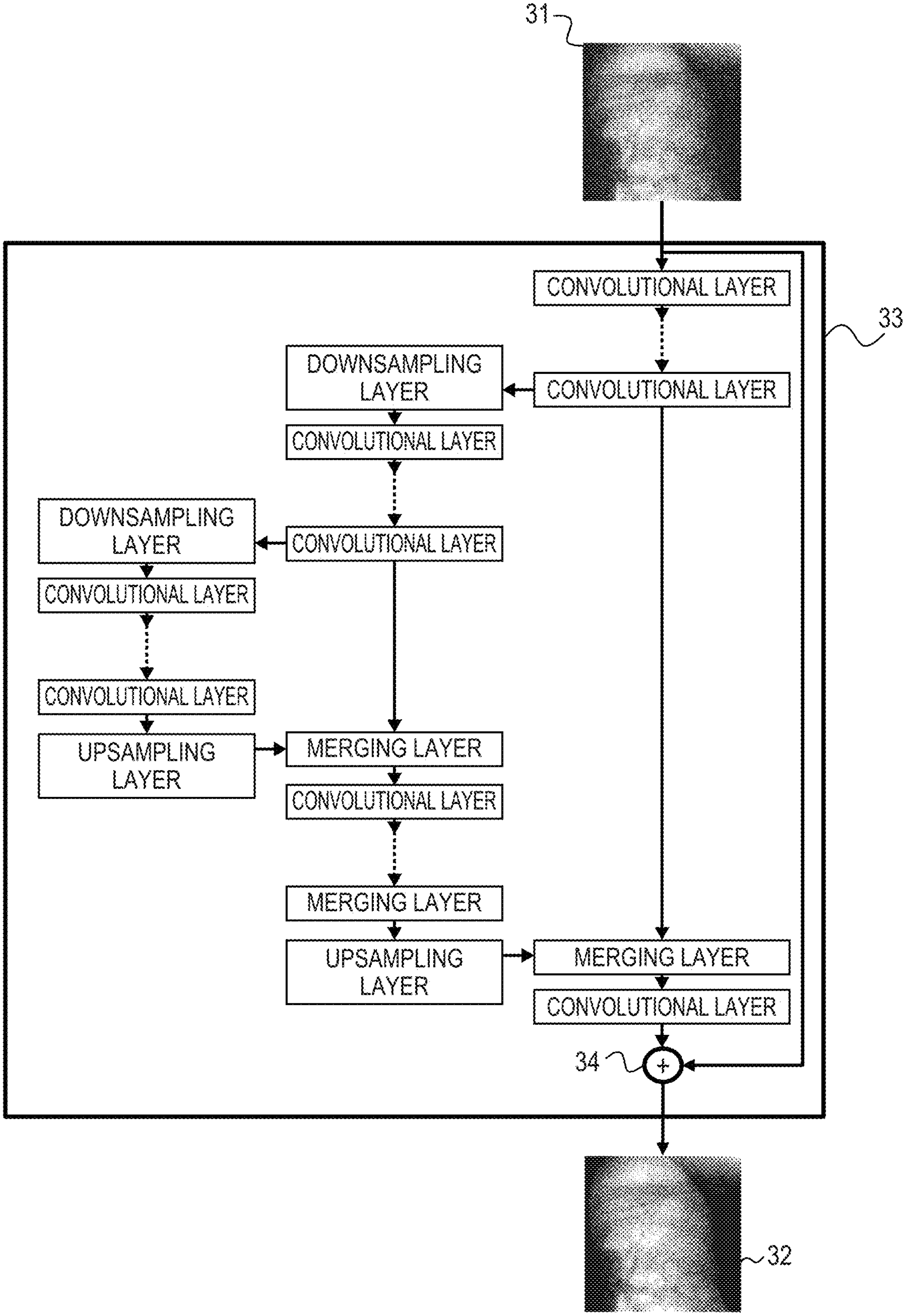
FIG. 3B is a diagram for illustrating an example of a schematic configuration of a CNN according to the first embodiment.
Figure 3C:
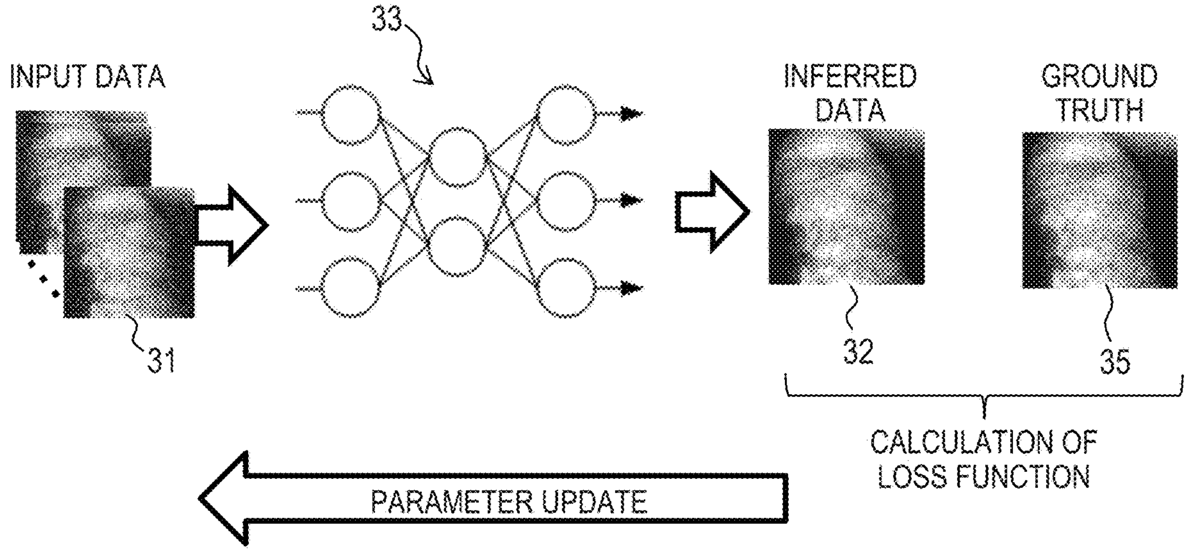
FIG. 3C is a diagram for explaining an operation example of training processing according to the first embodiment.

The CNN shown in FIG. 3B includes a plurality of layer groups that process input values and output them. Kinds of the layers included in the configured 33 of the CNN include a convolution layer, a downsampling layer, an upsampling layer, and a merging layer. Here, the configuration 33 of the CNN further may include an addition layer 34, and may include a shortcut for adding the input data before the output. Thus, the CNN can adopt a configuration for learning difference of the input data and the output data, and can suitably handle a system targeting the noise.

The convolutional layer is a layer that performs the convolution processing on input values according to parameters, such as the kernel size of a set filter, the number of filters, the value of a stride, and the value of dilation. The number of dimensions of the kernel size of the filter may also be changed according to the number of dimensions of an input image.

The downsampling layer is a layer that performs processing of making the number of output values less than the number of input values by thinning or combining the input values. Specifically, for example, there is the Max Pooling processing as such processing.

The upsampling layer is a layer that performs processing of making the number of output values more than the number of input values by duplicating the input values or adding a value interpolated from the input values. Specifically, for example, there is the upsampling processing by deconvolution as such processing.

The merging layer is a layer to which values, such as the output values of a certain layer and the pixel values constituting an image, are input from a plurality of sources, and that combines them by concatenating or adding them.

Note that if the parameter settings for the layer group or node group constituting the neural network are different, the reproducibility of the trend trained from training data may be different in inference. That is, in many cases, the appropriate parameter is different depending on the form in which the learning model is used, and can be changed to a preferable value if necessary.

In addition, in some cases, the CNN can obtain better characteristics by changing the configuration 33 of the CNN as well as by changing the parameters as described above. The better characteristics include, for example, outputting a radiation image in which the noise is reduced with higher accuracy, shorter processing time, and shorter training time for a machine learning model.

The configuration 33 of the CNN used in the first embodiment is a U-net type machine learning model having an encoder function including a plurality of hierarchies having a plurality of down-sampling layers and a decoder function including a plurality of hierarchies having a plurality of up-sampling layers. The U-net type machine learning model is configured (for example, by using a skip connection) such that the geometry information (space information) that is made ambiguous in the plurality of hierarchies configured as the encoder can be used in a hierarchy of the same dimension (mutually corresponding hierarchy) in the plurality of hierarchies configured as the decoder.

Although not shown, as an example of a modification of the configuration of the CNN, for example, layers of activation functions (e.g., ReLu: Rectifier Linear Unit) may be incorporated before and after the convolutional layer.

Through these steps of the CNN, characteristics of the noise can be extracted from the input radiation image.

The training processing unit 261 has a parameter updating unit 265. As shown in FIG. 3C, the parameter updating unit 265 calculates the loss function from the inferred data 32 obtained by applying the neural network model of inference processing unit 262 to the input data 31 in training data, and the ground truth 35 in the training data. Thereafter, the parameter updating unit 265 performs processing to update the parameters of the neural network model based on the calculated loss function. The loss function indicates the error between the inferred data 32 and the ground truth 35.

The parameter updating unit 265 can update the filter coefficient or the like of the convolutional layer using, for example, the error back-propagation method so that the error between the inferred data 32 and ground truth 35, which is represented by the loss function, is reduced. The error back-propagation method is a technique for adjusting the parameters or the like between the nodes of the neural network so that the error is reduced. A technique (dropout) for randomly inactivating the units (each neuron or each node) constituting the CNN may be used for the training.

In addition, the learned model used by inference processing unit 262 may be generated using the transfer learning. In this case, for example, the learned model used for the noise reduction processing may be generated by performing the transfer learning on a machine learning model which has been trained using the radiation image of an object to be inspected O with a different kind or the like. By performing such transfer learning, it is possible to efficiently generate a learned model for the object to be inspected O, for which it is difficult to obtain much training data. The object to be inspected O with a different kind or the like may be, for example, an animal, a plant, an object of the non-destructive inspection, or the like.

Here, the GPU can perform efficient arithmetic operations by processing parallel processing of larger amounts of data. Therefore, in the case of performing training a plurality of times using a machine learning model that utilizes the CNN as described above, it is effective to perform processing with a GPU. Therefore, in the training processing unit 261 according to the first embodiment, a GPU is used in addition to a CPU. Specifically, when a training program including a machine learning model is executed, training is performed by the CPU and the GPU cooperating to perform arithmetic operations. Note that, in the training processing, arithmetic operations may be performed by only the CPU or the GPU. Further, the respective processing performed by the inference processing unit 262 may be realized using a GPU, similarly to the training processing unit 261.

Whilst the configuration of a machine learning model has been described above, the present disclosure is not limited to a model that uses a CNN that is described above. It suffices that the learning performed by the machine learning model according to the first embodiment is learning that is similar to machine learning that uses a model capable of, by itself, extracting (representing) feature amount of training data such as an image by learning.

Here, the training processing unit 261 according to the first embodiment may use any set of training data for training the noise reduction processing. The training processing unit 261 may use, for example, a training data in which an image added with artificial noise is used as input data and an image not added with the artificial noise is used as ground truth. In addition, for example, training may be performed using an image before arithmetic averaging as input data and an image after the arithmetic averaging as ground truth, or using an image before statistical processing such as the maximum a posteriori probability (MAP) estimation processing as input data, and an image after the statistical processing as ground truth.

(Operation of an Image Processing Unit)

Next, the detailed operation of the image processing unit 22 in the movie imaging will be described with reference to FIG. 4A to FIG. 8C. In the movie imaging, a past frame near the current frame are often imaged with a similar structure. Therefore, when reducing the noise of the target pixel of the current frame, not only spatial information of surrounding similar structures and the like in the same frame but also temporal information of a similar structure and the like in the past frame can be used for the noise reduction.

From this viewpoint, the inference processing unit 262 can perform processing while utilizing more temporal information by inputting a plurality of frames into the input of the learned model. In this case, in order to perform the real-time processing, the inference processing unit 262 needs to adopt a configuration to input a total of N frames of the current frame and a predetermined number of the past frames as the input frames. The past frames to be used differ depending on the frame rate for the imaging and the required noise reduction performance. A case where N=10 frames are input (a case where the current frame+nine past frames are input) will be described below as one example of a suitable example.

Figure 4A:
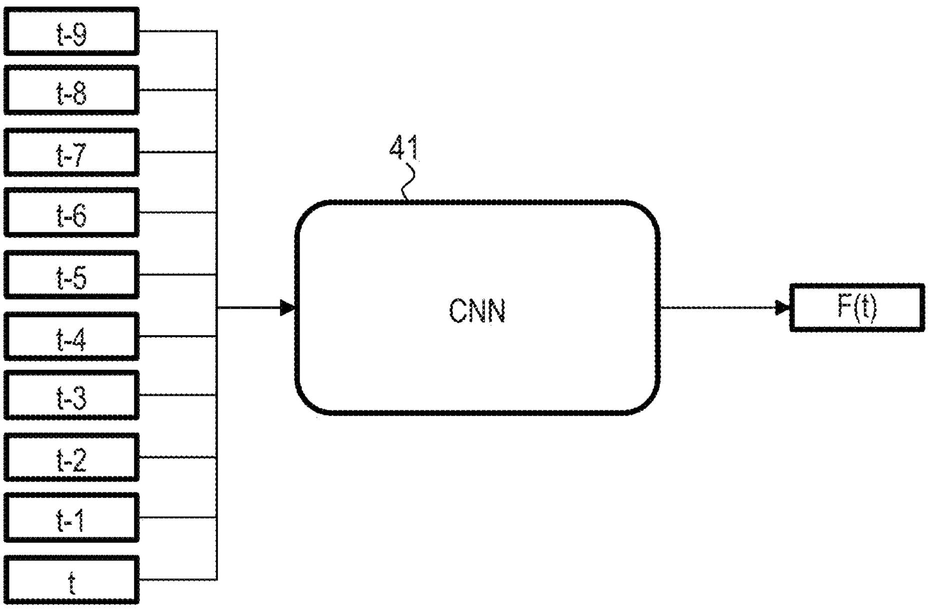
FIG. 4A is a diagram for illustrating an example of a schematic configuration of the CNN according to the first embodiment.

FIG. 4A is a schematic diagram of the configuration of the neural network in the case where N=10. In the example shown in FIG. 4A, the number of the current frame is "t", and the current frame and the past frames of which the numbers are t−1 to t−9 are sequentially inputted to the learned CNN 41. Using such a CNN 41, the inference processing unit 262 can obtain a noise reduced image F (t) obtained by performing the noise reduction processing using the spatial information of the current frame and the temporal information of the nine past frames. Similar to the above input, the learned CNN 41 has been trained using the training data which includes N=10 consecutive frames as input data, and the correct image corresponding to the frame with the number t as ground truth.

Figure 4B:
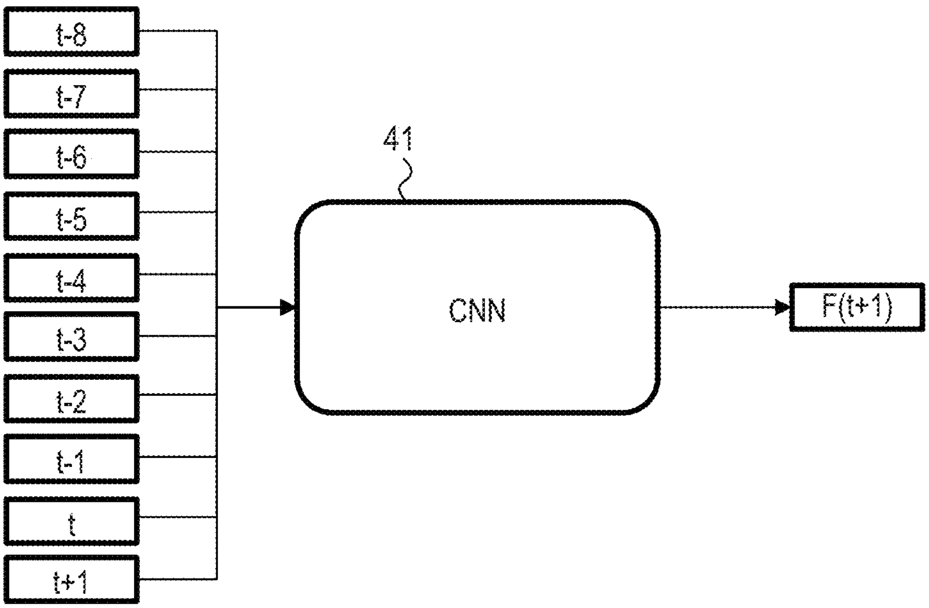
FIG. 4B is a diagram for illustrating an example of a schematic configuration of the CNN according to the first embodiment.

With regard to the next frame, as shown in FIG. 4B, the inference processing unit 262 can input the frame with the number t+1 corresponding to the current frame and the past frames with the numbers t to t−8 to the learned CNN 41, and obtain a noise reduced image F(t+1). By doing this processing sequentially, the inference processing unit 262 can obtain a suitable noise reduced image in real-time.

However, in a case where the input frames are not completely obtained as N (10) frames, i.e., when t is 0 to 8 immediately after the start of imaging, a problem arises. FIG. 5A and FIG. 5B are tables showing the relationship between the CNN input frames and the number of the current frame in a case where a predetermined numbers of frames are not completely obtained immediately after the imaging. As shown in FIG. 5A, until the imaging at t−9 is completed, a situation occurs in which a number of input frames originally assumed for the CNN 41 are not completely obtained and the inference processing unit 262 cannot operate the CNN 41 normally.

As described above, in the X-ray movie imaging for medical use, it is desired that all imaged frames are output as images from the viewpoint of exposure to the subject, and it is required to have a configuration that does not cause an invalid exposure. Furthermore, in order to perform the medical treatment promptly, it is desired to provide an image with suitably reduced noise by the real-time processing even when only one frame immediately after imaging is available. Therefore, it is desired to handle the problem in the imaging with the current frame number t=0 to t=8.

Figure 6:
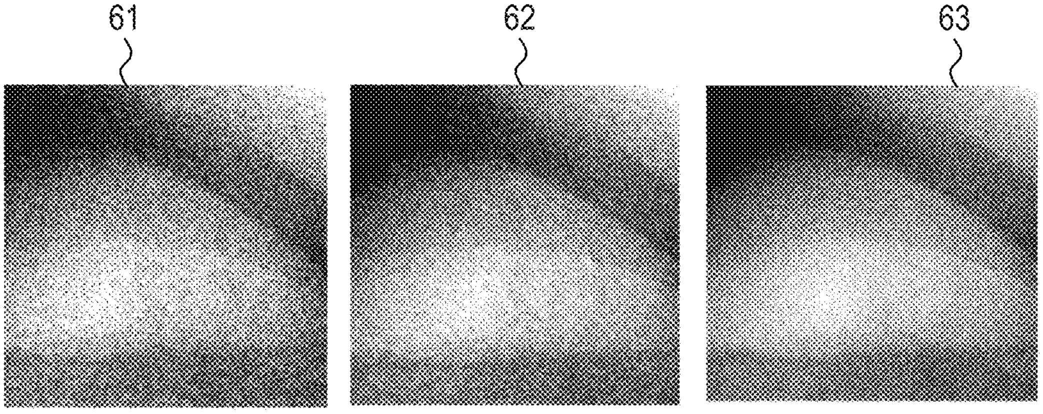
FIG. 6 is a diagram for illustrating an example of an image before and after image processing according to the first embodiment.

FIG. 6 is a diagram for illustrating an example showing a part of an image in a certain frame. An image 61 is an example of an image before performing the noise reduction, and images 62 and 63 are examples of images after performing the noise reduction processing.

An example will be described in which, as in the case 1 shown in FIG. 5B, when a number of input frames originally assumed for the CNN 41 does not exist, an obtained frame (for example, a frame with the frame number 0) is used as the unobtained frame for the processing. In the example shown in FIG. 5B, the number t of the current frame will be described as 5. In this case, as shown in the image 62 in FIG. 6, not only the noise reduction effect is low, but also artifacts occur in the image, and therefore an image unsuitable for the diagnosis is output. On the other hand, as in the case 2 shown in FIG. 5B, when a number of input frames originally assumed for the CNN 41 are completely obtained (in a case of assuming that frames of frame numbers −1 to −4 are obtained), a suitable noise reduction effect can be exerted as shown in the image 63 in FIG. 6.

Figure 7:
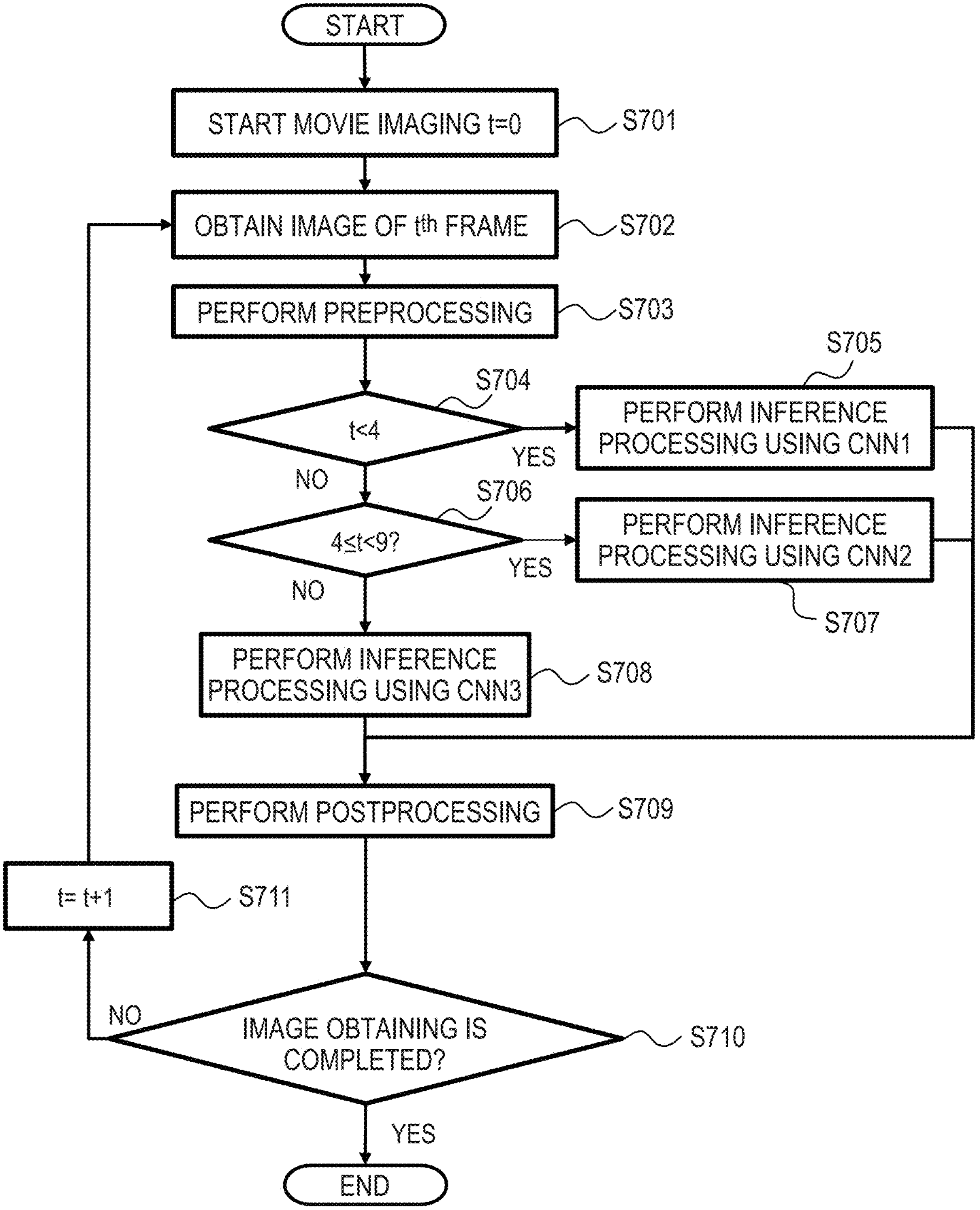
FIG. 7 is a flowchart of an operation of the radiation imaging system according to the first embodiment.

In view of this situation, the configuration of the radiation imaging system 1 according to the first embodiment will be described with reference to FIG. 7 to FIG. 8C. FIG. 7 is a diagram for illustrating an example of the flow of operation of the noise reduction processing unit 26 for the movie imaging. FIG. 8A to FIG. 8C are diagrams for illustrating examples of schematic configurations of the CNNs used by the inference processing unit 262.

In the first embodiment, three kinds of CNNs used for inference processing are prepared, and the learned model selecting unit 263 can selects an appropriate learned model as a learned model used by the inference processing unit 262. A first CNN 81 (CNN1), a second CNN 82 (CNN2), and a third CNN 83 (CNN3), which are the three kinds of CNNs, use different numbers of input frames such that the numbers of input frames are $N_1=1$, $N_2=5$, and $N_3=10$, respectively.

Each of the CNNs is trained by the training processing unit 261 so as to obtain the optimum performance with a predetermined number of input frames. Specifically, the first CNN 81 can be trained using, for example, a set of a noise-added frame of which the number is t and a noise-unadded frame of which the number is t as the training data. Further, the second CNN 82 can be trained a set of a noise-added frame of which the number is t, past frames of which the numbers are t−1 to t−4 and a noise-unadded frame of which the number is t as the training data. Similarly, the third CNN 83 can be trained a set of a noise-added frame of which the number is t, past frames of which the numbers are t−1 to t−9 and a noise-unadded frame of which the number is t as the training data.

The operation of the noise reduction processing unit 26 will be described below with reference to FIG. 7. First, if movie imaging sequence is started in step S701, the noise reduction processing unit 26 sets the number of the initial frame to t=0.

In step S702, the noise reduction processing unit 26 obtains an image at the t-th frame through the obtaining unit 21. Initially, the noise reduction processing unit 26 obtains a single frame at t=0.

In step S703, the noise reduction processing unit 26 perform preprocessing on the image obtained in step S702 in order to perform suitable inference processing. The method of preprocessing is not limited. For example, in the noise reduction processing, the quantum noise following the Poisson distribution can be made substantially constant regardless of the intensity of the input radiation by performing, for example, the square root transformation or the logarithmic transformation as the preprocessing. Further, as the preprocessing, processing of transformation to handle additive noise or a processing for causing the average value to zero can be used. In addition, the noise reduction processing unit 26 may perform a suitable preprocessing according to the contents of the image processing, such as normalizing the data by 0 to 1 or standardizing the data so that the average value is 0 and the standard deviation is 1. Since the preprocessed frame is used in the inference processing of the subsequent frame, it can be temporarily stored in the memory until the usage of the preprocessed frame is completed.

In step S704, the learned model selecting unit 263 determines the number of frames currently obtained, and in particular, determines whether t is less than 4. Here, if t is less than 4, the process proceeds to step S705. In step S705, the learned model selecting unit 263 selects the first CNN 81 shown in FIG. 8A as the learned model used by the inference processing unit 262. The inference processing unit 262 uses the selected first CNN 81 to perform the inference processing with the input of one current frame. Under such a situation, since it is difficult to use time information because only a few past frames have been obtained, the noise reduction processing unit 26 can perform the noise reduction using only the spatial information.

On the other hand, if t is 4 or more, the process proceeds to step S706. In step S706, the learned model selecting unit 263 determines whether t is 4 or more and less than 9. If t is 4 or more and less than 9, the process proceeds to step S707. In step S707, the learned model selecting unit 263 selects the second CNN 82 shown in FIG. 8B as the learned model used by the inference processing unit 262. The inference processing unit 262 uses the selected second CNN 82 to perform the inference processing with a total of five inputs, i.e., one current frame and four past frames. Under the situation of proceeding to step S707, a certain number of past frames has been obtained, although not enough, and time information can be used. Therefore, in step S707, the calculation resource of the CNN is used so as to perform the noise reduction using both of the spatial information and the time information. In this case, the noise reduction processing unit 26 cannot use as much time information as the third CNN 83 can, but the noise reduction processing unit 26 can prevent at least the situation of generating artifacts as shown in the image 62 in FIG. 6, and reduce the noise suitably.

On the other hand, if t is 9 or more, the processing proceeds to step S708. In step S708, since t is 9 or more, the number of past frames for sufficiently using the time information is completely obtained. Therefore, the learned model selecting unit 263 selects the third CNN 83 shown in FIG. 8C as the learned model used by the inference processing unit 262. The inference processing unit 262 uses the selected third CNN 83 to perform the processing with a total of ten inputs, i.e., one current frame and nine past frames, and can prevent the occurrence of artifacts and to perform the noise reduction by maximally utilizing the time information.

In step S709, the noise reduction processing unit 26 performs postprocessing on the result of the inference processing. The postprocessing includes reverse processing of various transformations such as the normalization and the standardization performed in the preprocessing in step S703.

In step S710, the noise reduction processing unit 26 determines whether or not the image obtaining is completed. The noise reduction processing unit 26 may, for example, determine whether or not the image obtaining is completed based on the set imaging-condition or the instruction from the operator. If the image obtaining is continued, the process proceeds to step S711. In step S711, the noise reduction processing unit 26 adds 1 to the frame number t, the process proceeds to step S702, and the noise reduction processing unit 26 repeats the processes in steps S702 to S710.

By the processes in steps S701 to S711, the noise reduction processing unit 26 can perform the real-time processing so that an image with suitably reduced noise is obtained even when only one frame immediately after the imaging is available.

As described above, the radiation imaging system 1 according to the first embodiment includes the controlling unit 20, the radiation generator 30, and the radiation detector 10. The radiation generator 30 functions as an example of a radiation generating apparatus that irradiates radiation, and the radiation detector 10 functions as an example of a radiation detecting apparatus that detects the irradiated radiation. The controlling unit 20 functions as an example of an image processing apparatus that applies image processing to a moving image including a plurality of frames of radiation images.

The controlling unit 20 includes the learned model selecting unit 263 and the inference processing unit 262. The learned model selecting unit 263 functions as an example of a selecting unit that selects a learned model used for image processing of a frame to be processed from among a plurality of learned models which differ from each other in the number of frames to be input, based on the number of frames which has been obtained. The inference processing unit 262 functions as an example of an inference processing unit that performs inference processing using the selected learned model in the image processing of a frame to be processed. The image processing may include a noise reduction processing in which noise in an image is reduced. According to such a configuration, the radiation imaging system 1 according to the first embodiment can suitably and in real-time apply the image processing to the moving image even immediately after the imaging.

The plurality of learned models may include a learned model of which the number of frames to be input is one and a learned model of which the number of frame to be input is more than one. Therefore, the controlling unit 20 according to the first embodiment can suitably and in real-time apply the image processing to the moving image not only in a situation where a plurality of frames have been obtained but also in a situation where only one frame has been obtained.

Further, the inference processing unit 262 may input one first frame, which is a frame to be processed, and zero or more second frames obtained prior to the first frame to the selected learned model in accordance with the number of frames to be input of the selected learned model, and infer an image which is obtained by applying the image processing to the first frame. According to such a configuration, the controlling unit 20 can perform the image processing using frames before the frame to be processed, and can suitably and in real-time apply the image processing to the moving image.

The learned model selecting unit 263 may select, from among the plurality of learned models based on the number of frames which have been obtained, a learned model of which the number of frames to be input is less than or equal to the number of frames which have been obtained, and of which the number of frames to be input is larger than other learned models of which the number of frames to be input is less than or equal to the number of frames which have been obtained. According to such a configuration, the controlling unit 20 can perform the image processing using the learned model which can perform more suitable image processing based on the number of frames which have been obtained.

Each of the plurality of learned models is obtained by performing training using a training data including a number of images corresponding to the number of frames to be input and an image obtained by performing image processing on an image to be processed among the images. According to such a configuration, a learned model to which a plurality of frames are inputted can use not only the spatial information of surround similar structures and the like in the same frame but also the temporal information of similar structures and the like in a plurality of frames to be input for the image processing. Therefore, the controlling unit 20 according to the first embodiment can more suitably and in real-time apply the image processing to the moving image even immediately after the imaging. With regard to the training data described above, an image obtained by adding artificial noise can correspond to a number of images corresponding to the number of frames to be input before the noise reduction processing, and an image before the addition of the artificial noise can correspond to an image obtained by applying the noise reduction processing to the image to be processed.

If the entire image cannot be processed at one time due to the memory amount or other performance of the image processing unit 22, the image may be divided into small areas of appropriate size (e.g., 256×256 pixels) for the processing.

The number of frames to be input to the learned model is not limited to N=10, but may be any number of two or more. Since a structure similar to the target pixel of the current frame cannot be obtained in the temporal information if the influence of the movement of the object to be inspected O increases, the number of frames to be input can be set to be within a certain real time in consideration of the frame rate.

An example of using models with three configurations: the first CNN 81 to which one frame is input, the second CNN 82 to which five frames are input, and a third CNN 83 to which ten frames are input is described in the above. However, the configuration of the learned model to be used is not limited to this configuration. The kinds of the learned models to be used and the number of input frames of each learned model may be set according to the desired configuration. For example, the kinds of the learned models and the number of frames to be input may be freely modified according to the sensitivity of the detector used for the imaging, the bias voltage, the noise characteristics, the amplification factor at readout, the frame rate, the image size, the accumulation time at signal reception, and the imaging technique.

Second Embodiment

The image processing unit of a second embodiment of the present disclosure will be described with reference to FIG. 9A to FIG. 10C. FIG. 9A to FIG. 9E are diagrams for illustrating examples of the operation flow of a radiation imaging system according to the second embodiment. In FIG. 9A to FIG. 9E, a radiography imaging mode refers to an imaging mode for imaging a moving image by radiation imaging, and a general imaging mode refers to an imaging mode for imaging a still image by the radiation imaging. Here, the imaging mode means, for example, a set of setting of the sensitivity of the radiation detector in the radiation imaging system, the bias voltage, the noise characteristics, the amplification factor at readout, the frame rate, the image size, the accumulation time at the signal reception, and imaging technique. Since the configuration other than an image processing unit 22 of the radiation imaging system according to the second embodiment is the same as the configuration of the radiation imaging system 1 according to first embodiment, the description will be omitted using the same reference numerals.

Figure 9A:
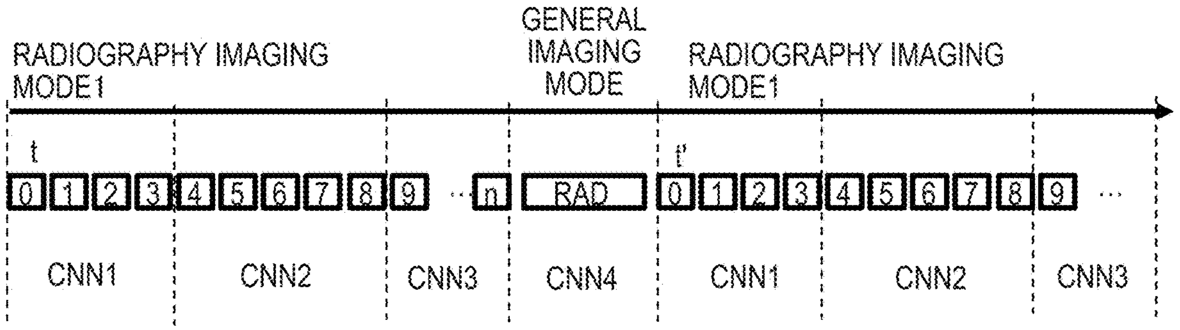
FIG. 9A is a schematic diagram for illustrating operation of a radiation imaging system according to a second embodiment.

FIG. 9A is a diagram for illustrating the flow when images of n+1 frames of t=0 to t=n (n≥9) are obtained by performing radiography imaging (first radiography imaging), a still image is obtained by performing general imaging after the radiography imaging, and the radiography imaging (second radiography imaging) is performed again. Here, it is assumed that the first radiography imaging and the second radiography imaging are performed in the same mode of the radiation imaging system (radiography imaging mode 1). In FIG. 9A, in the second radiography imaging, the frame number is set as t' and renumbered from 0.

Figure 8A:
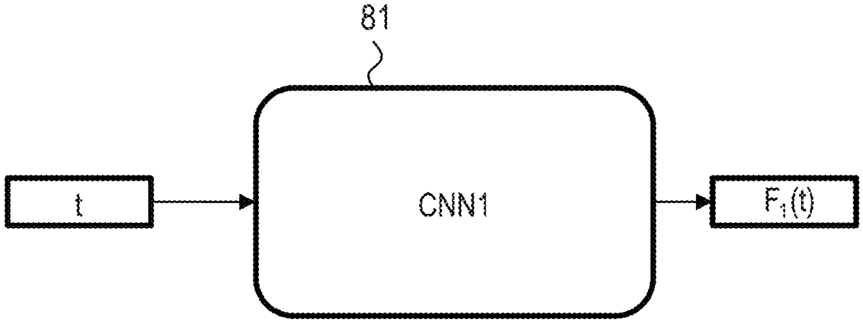
FIG. 8A is a diagram for illustrating an example of a schematic configuration of the CNN according to the first embodiment.

Here, after the start of imaging and during t=0 to t=3 in the radiography imaging mode 1, the learned model selecting unit 263 selects the first CNN 81 (CNN1) shown in FIG. 8A as the learned model used for the inference processing. The inference processing unit 262 performs the inference processing of which the input is one frame using the selected first CNN 81. Further, during t=4 to t=8, the learned model selecting unit 263 selects the second CNN 82 (CNN2) shown in FIG. 8B, and the inference processing unit 262 performs the inference processing of which the input is five frames using the second CNN 82. Furthermore, during t=9 to t=n, the learned model selecting unit 263 selects the third CNN 83 (CNN3) shown in FIG. 8C, and the inference processing unit 262 perform the inference processing of which the input is ten frames using the third CNN 83.

After that, when performing the imaging in the general imaging mode, the learned model selecting unit 263 selects a fourth CNN (CNN4), which is a CNN different from the first CNN 81 to the third CNN 83, and has been trained for the general imaging mode, as the learned model used for the inference processing. The inference processing unit 262 performs the inference processing using the selected fourth CNN. Here, as the fourth CNN, it is preferable to use a CNN which has been trained so as to use one frame as an input and suitably perform the noise reduction processing according to the characteristics of general imaging mode.

As another configuration, if radiography imaging mode used before the general imaging mode is limited, it is also possible to use a CNN to which a plurality of frames are input by adding a frame obtained by the radiography imaging performed before the general imaging to the input of the fourth CNN. In this case, training data may use an image captured in the general imaging mode and a frame obtained by the radiography imaging performed before the general imaging as input data, and an image obtained by performing the noise reduction processing on the image captured in the general imaging mode as ground truth. Similarly to the first embodiment, the training may be performed using training data using an image to which the artificial noise is added.

Next, the operation proceeds to the imaging at the radiography imaging mode 1 again, and during t'=0 to t'=3, the learned model selecting unit 263 selects the first CNN 81 shown in FIG. 8A. The inference processing unit 262 performs the inference processing of which the input is one frame using the selected first CNN 81. Further, the learned model selecting unit 263 selects the second CNN 82 shown in FIG. 8B during t'=4 to t'=8, and the inference processing unit 262 performs the inference processing of which the input is five frames using the second CNN 82. Furthermore, the learned model selecting unit 263 selects the third CNN 83 shown in FIG. 8C during t'=9 and t'=n, and the inference processing unit 262 performs the inference processing of which input is ten frames using the third CNN 83.

Figure 9B:
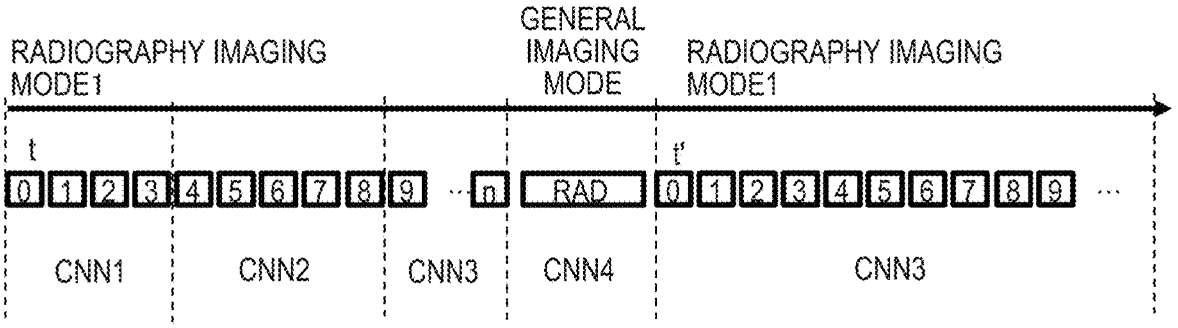
FIG. 9B is a schematic diagram for illustrating the operation of the radiation imaging system according to the second embodiment.

In the flow shown in FIG. 9B, the imaging procedure is the same as that in FIG. 9A, but there is a difference in the use of the third CNN 83 from t'=0 in the second radiography imaging. As in this example, in a case where the first imaging and the second imaging are in the same mode and the time interval between the two radiography imaging is short, for example, a case where the general imaging mode or other short imaging is interposed, the current frame t'=0 and the past frame t=n to t=n−8 may be used as the input. In this case, the learned model selecting unit 263 selects the third CNN 83 from t'=0 in the second radiography imaging, and the inference processing unit 262 can perform the inference processing of the frame of which the input is ten using the third CNN 83.

Figure 9C:
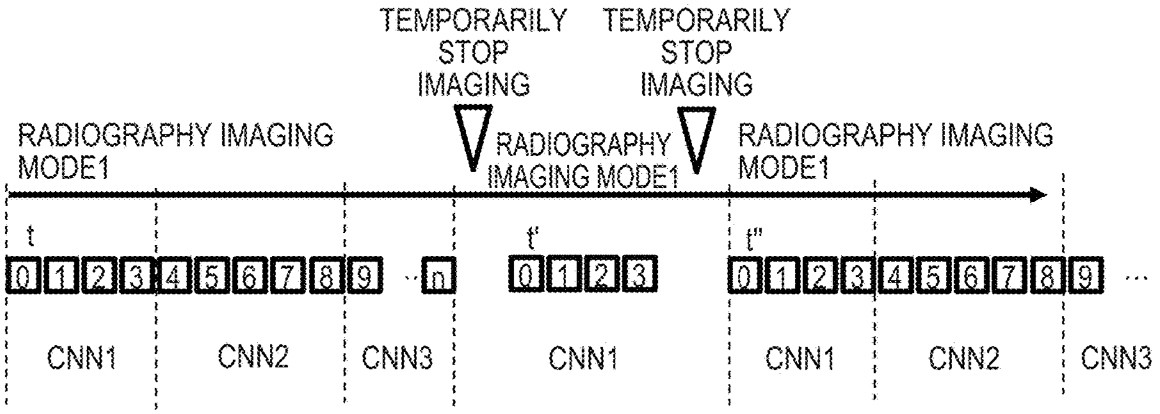
FIG. 9C is a schematic diagram for illustrating the operation of the radiation imaging system according to the second embodiment.

FIG. 9C is a diagram for illustrating the flow when the images of n+1 frames of t=0 to t=n (n≥9) are obtained by performing the radiography imaging, the imaging is temporary stopped and the short-term imaging (t'=0 to t'=3) is interposed after the radiography imaging, and the radiography imaging (t"=0~) is further performed. The temporary stop of the imaging and the short-term imaging may be performed by momentarily repeating the ON-OFF of a switch such as a foot pedal for the radiation irradiation.

In this case, after the start of imaging and during t=0 to t=3 in the radiography imaging mode 1, the learned model selecting unit 263 selects the first CNN 81 shown in FIG. 8A as the learned model used for the inference processing. The inference processing unit 262 performs the inference processing of which the input is one frame using the selected first CNN 81. Further, during t=4 to t=8, the learned model selecting unit 263 selects the second CNN 82 shown in FIG. 8B, and the inference processing unit 262 performs the inference processing of which the input is five frames using the second CNN 82. Furthermore, during t=9 and t=n, the learned model selecting unit 263 selects the third CNN 83 shown in FIG. 8C, and the inference processing unit 262 performs the inference processing of which the input is ten frames using the third CNN 83. Thereafter, the learned model selecting unit 263 selects the first CNN 81 as the learned model to be used for the inference processing during t'=0 to t'=3, and the inference processing unit 262 performs the inference processing of which the input is one frame using the first CNN 81. After that, the radiation imaging system shifts to the imaging at the radiography imaging mode 1 again, and after t"=0, it behaves the same as after t=0.

Figure 9D:
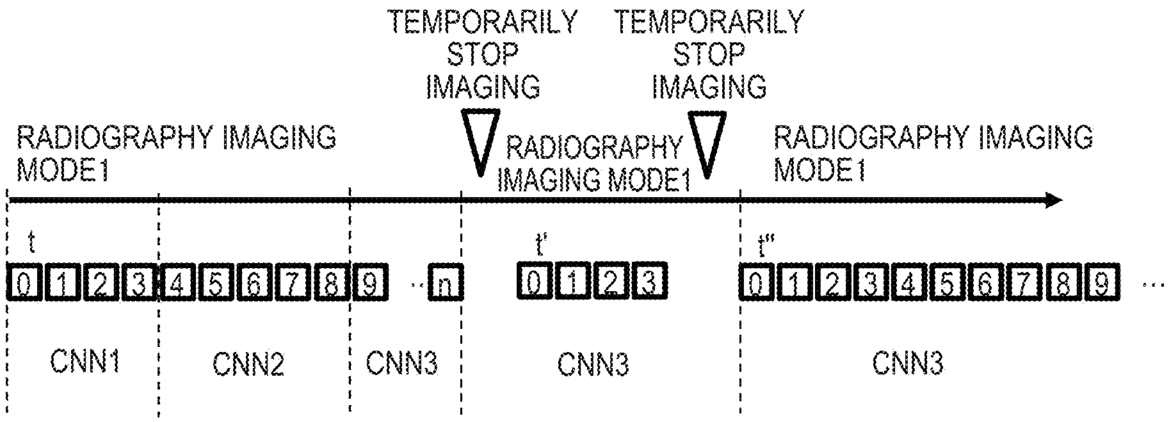
FIG. 9D is a schematic diagram for illustrating the operation of the radiation imaging system according to the second embodiment.

As shown in FIG. 9D, the imaging procedure is the same as that in FIG. 9C, but during t'=0 to t'=3 and after t"-=0, it is possible to operate the third CNN 83 by using frames backward from t=n as the past frames, if necessary.

Figure 8B:
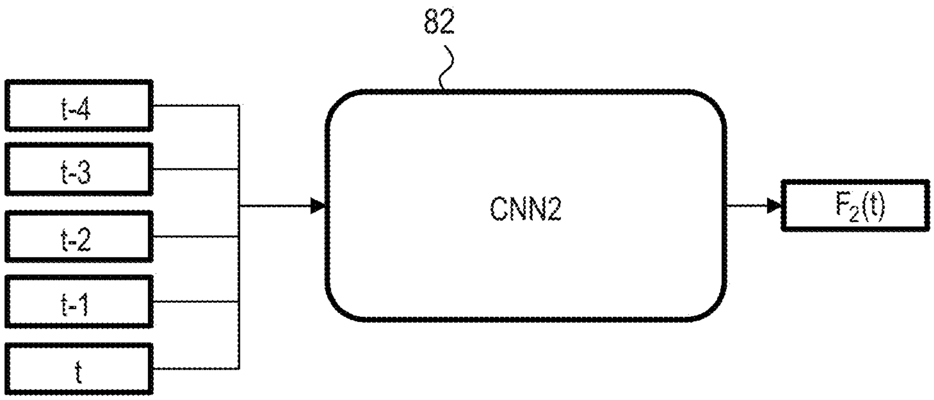
FIG. 8B is a diagram for illustrating an example of a schematic configuration of the CNN according to the first embodiment.
Figure 8C:
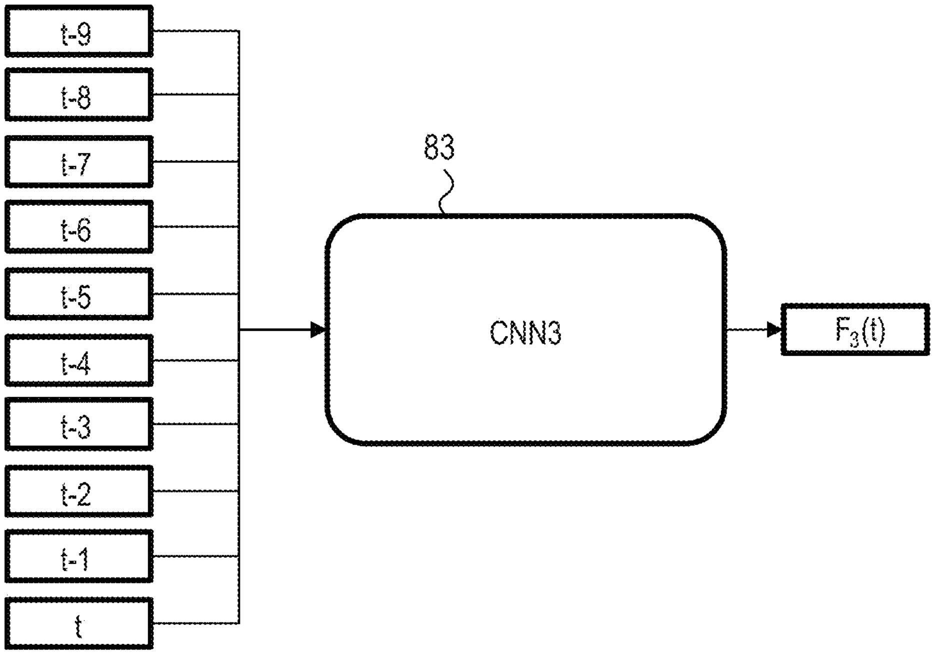
FIG. 8C is a diagram for illustrating an example of a schematic configuration of the CNN according to the first embodiment.
Figure 9E:
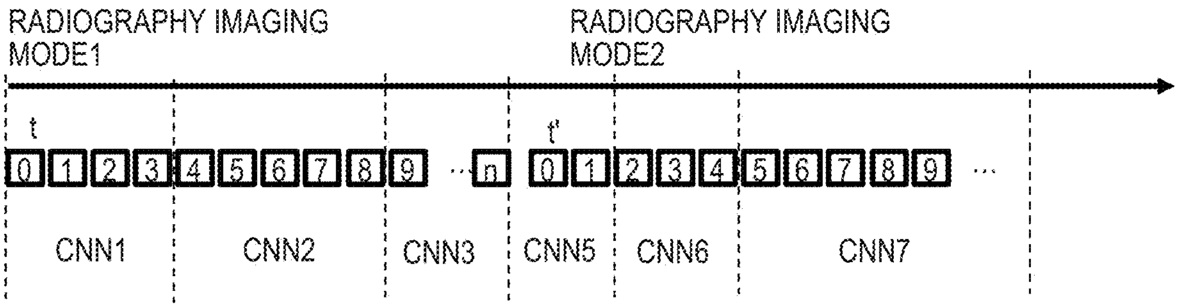
FIG. 9E is a schematic diagram for illustrating the operation of the radiation imaging system according to the second embodiment.

FIG. 9E is a diagram for illustrating an example in which images of n+1 frames of t=0 to t=n (n≥9) is obtained by performing the radiography imaging at the radiography imaging mode 1, and then the imaging mode is switched to another radiography imaging mode 2 and frames after t'=0 are obtained. In this case, after the start of imaging and during t=0 to t=3 in the radiography imaging mode 1, the learned model selecting unit 263 selects the first CNN 81 shown in FIG. 8A as the learned model used for the inference processing. The inference processing unit 262 performs the inference processing of which the input is one frame using the selected first CNN 81. Further, during t=4 to t=8, the learned model selecting unit 263 selects the second CNN 82 shown in FIG. 8B, and the inference processing unit 262 performs the inference processing of which the input is five frames using the second CNN 82. Furthermore, during t=9 and t=n, the learned model selecting unit 263 selects the third CNN 83 shown in FIG. 8C, and the inference processing unit 262 performs the inference processing of which the input is ten frames using the third CNN 83.

Figure 10A:
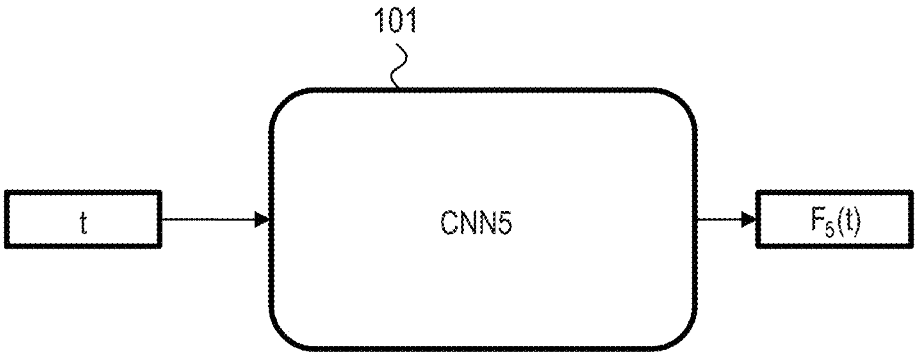
FIG. 10A is a diagram for illustrating an example of a schematic configuration of a CNN according to the second embodiment.
Figure 10B:
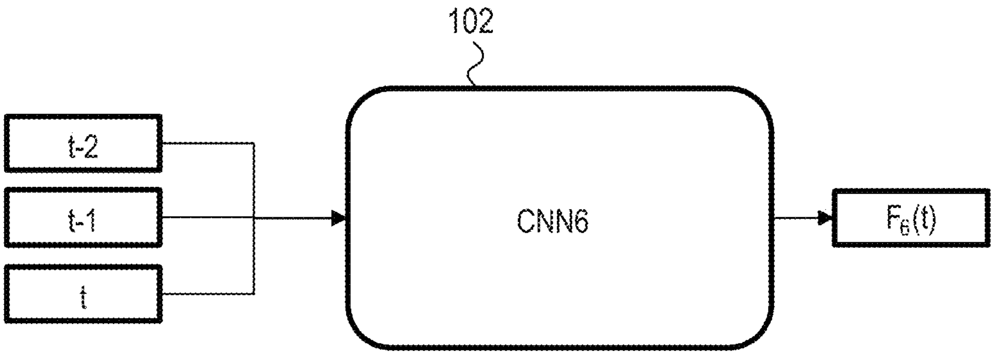
FIG. 10B is a diagram for illustrating an example of a schematic configuration of the CNN according to the second embodiment.
Figure 10C:
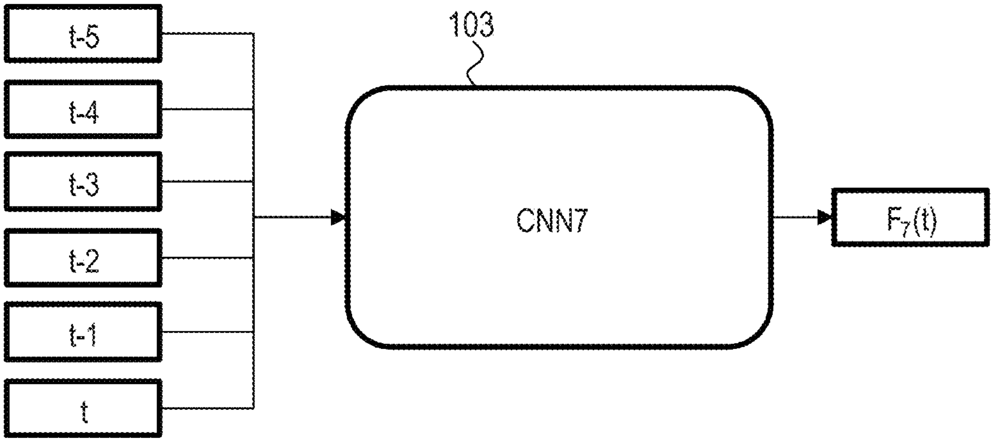
FIG. 10C is a diagram for illustrating an example of a schematic configuration of the CNN according to the second embodiment.

Thereafter, the radiation imaging system switches to the radiography imaging mode 2 and performs processing of the frame after t'=0. FIG. 10A to FIG. 10C are schematic diagrams of CNNs used at another mode (here, the radiography imaging mode 2) by the inference processing unit 262, and each of the CNNs has been trained so as to be optimized for the characteristics of the image at the radiography imaging mode 2.

As described above, the kinds of the CNNs to be used and the number of input frames of each of the CNNs may be freely changed according to the image resolution of the system to be used, the frame rate for the imaging, the imaging technique, etc. For example, in an imaging mode of which the frame rate is low, if the number of input frames of the CNN is too large, it may take too long to prepare the number of frames for maximum performance, or the movement of subject may become too large and the time information may not be utilized properly. Therefore, in a case where the frame rate is low, it is effective to reduce the number of input frames of the CNN.

FIG. 10A to FIG. 10C are diagrams for illustrating examples of configuration of CNNs in which the numbers of input frames are different from the CNNs shown in FIG. 8A to FIG. 8C. In the example shown in FIG. 9D, during t'=0 to t'=1, the learned model selecting unit 263 selects the fifth CNN 101 (CNN5) shown in FIG. 10A as the learned model used for the inference processing. The inference processing unit 262 performs the inference processing of which the input is one frame using the selected fifth CNN 101. Further, during t'=2 to t'=4, the learned model selecting unit 263 selects the sixth CNN 102 (CNN6) shown in FIG. 10B, and the inference processing unit 262 performs the inference processing of which the input is three frames using the sixth CNN 102. Furthermore, after t'=5, the learned model selecting unit 263 selects the seventh CNN 103 (CNN7) shown in FIG. 10C, and the inference processing unit CNN 262 performs the inference processing of which the input is six frames using the seventh CNN 103.

Here, the first CNN to seventh CNN illustrated above may be CNNs having the same network structure except for the number of input frames, in which only the trained parameters are different, or they may have different network structures.

As described above, in the controlling unit 20 according to the second embodiment, the plurality of learned models may include a group of learned models according to an imaging mode. The learned model selecting unit 263 can select, from the group of the learned models corresponding to an imaging mode of the moving image to be processed, the learned model used for the image processing of the frame to be processed based on the number of frames which have been obtained. According to such a configuration, the controlling unit 20 can more suitably and in real-time apply the image processing to the moving image in accordance with the imaging mode. The imaging mode can be set based on at least one of the sensitivity of the detector used for the imaging, the bias voltage, the noise characteristics, the amplification factor at readout, the frame rate, the image size, the accumulation time at the signal reception, and the imaging technique.

Further, the learned model selecting unit 263 may exclude the number of frames obtained at an imaging mode which is different from the imaging mode of the moving image to be processed from the number of frames which have been obtained. In this case, the controlling unit 20 can prevent a situation in which the image processing is not suitably performed due to the use of frames obtained at the different imaging mode as input.

Further, in a second imaging at a predetermined imaging mode performed after a first imaging at the predetermined imaging mode, the learned model selecting unit 263 can include the number of frames obtained in the first imaging in the number of frames which have been obtained. According to such a configuration, the controlling unit 20 can use the frames obtained in the first imaging for the image processing in the second imaging in a case where the first imaging and the second imaging are in the same mode and the time interval between the two imaging is short. Therefore, the time information can be used for the image processing even immediately after the start of the second imaging, and the image processing can be applied to the moving image more suitably and in real-time.

According to the configuration according to the second embodiment, the radiation imaging system according to the second embodiment can perform the real-time processing so as to obtain an image in which the noise is reduced suitably for all frames even if the imaging mode changes during imaging.

Third Embodiment

In the above-described embodiments, as an example of the image processing performed by the image processing unit 22, the noise reduction processing by the noise reduction processing unit 26 has been described. However, the present disclosure is not limited thereto, and it is possible to adopt the above configuration for any image processing using a machine learning model for the moving image. In a third embodiment of the present disclosure, an example of an image processing unit which performs super resolution processing for improving the resolution of an image as the image processing for the moving image will be described. Since the configuration other than image processing unit 22 of a radiation imaging system according to the third embodiment is the same as the configuration of the radiation imaging system 1 according to the first embodiment, an explanation will be omitted using the same reference numerals.

Figure 11A:
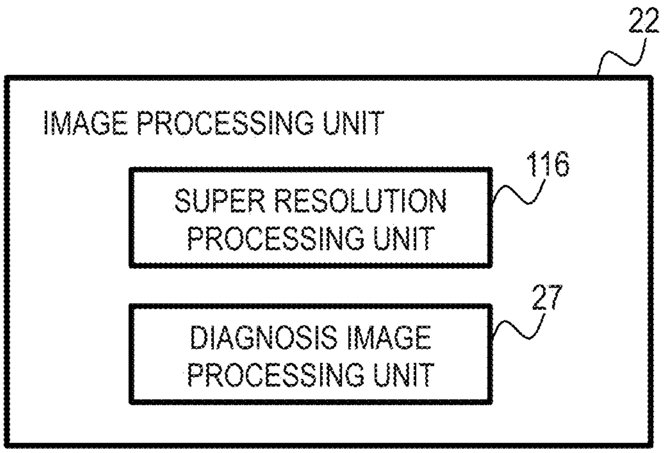
FIG. 11A is a diagram for illustrating an example of a schematic configuration of an image processing unit according to a third embodiment.

FIG. 11A is a diagram for illustrating an example of a schematic configuration of the image processing unit 22 according to the third embodiment. The image processing unit 22 according to the third embodiment includes a super resolution processing unit 116 instead of the noise reduction processing unit 26.

Figure 11B:
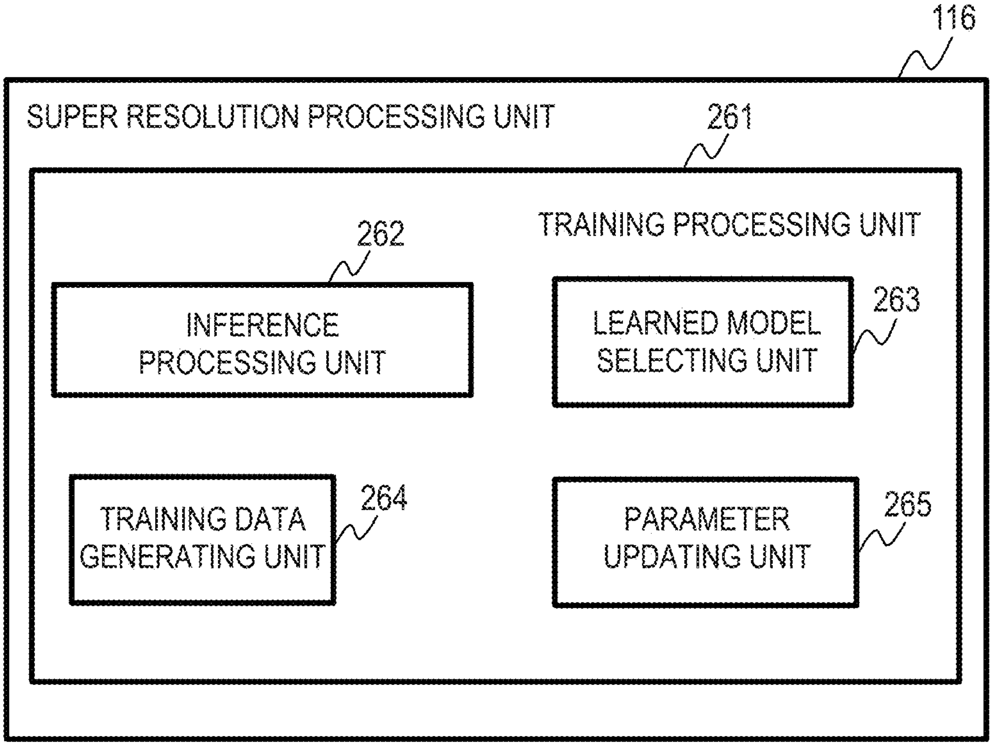
FIG. 11B is a diagram for illustrating an example of a schematic configuration of a super resolution processing unit according to the third embodiment.

FIG. 11B is a diagram for illustrating an example of a schematic configuration of the super resolution processing unit 116. The configuration of the super resolution processing unit 116 is similar to that of the noise reduction processing unit 26 according to first embodiment, and the super resolution processing unit 116 includes the training processing unit 261 and the inference processing unit 262. The training processing unit 261 includes the training data generating unit 264 and the parameter updating unit 265 in addition to the configuration of the inference processing unit 262 and the learned model selecting unit 263.

Figure 12:
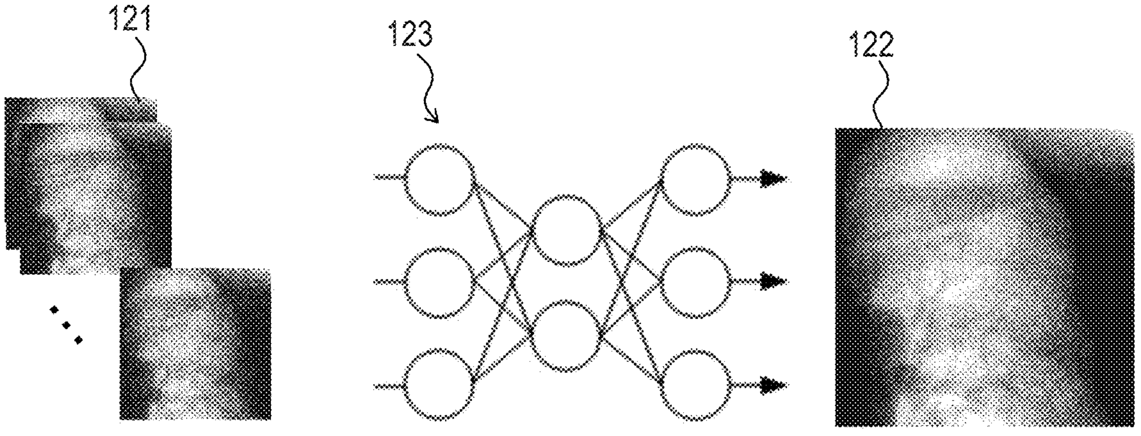
FIG. 12 is a diagram for illustrating an example of a schematic configuration of a learned model according to the third embodiment.

FIG. 12 is a diagram for illustrating a schematic configuration example of a neural network model used for the super resolution processing according to the third embodiment. The configuration 123 of the neural network model shown in FIG. 12 is designed to output inferred data 122 of which the resolution is improved in accordance with a tendency trained in advance, with regard to the input data 121. The input data 121 may include one or more frames with a resolution lower than the desired resolution, and include, for example, the current frame and one or more frames prior to the current frame. The neural network model has a configuration 123 that has been trained using a set of training data in which an image with a low resolution is used as input data and an image with the desired resolution is used as ground truth. The neural network model is configured to output the inferred data 122, which is an image after the super resolution processing, according to the configuration 123 if the input data 121 which is a radiation image is input. It is also possible to configure a learned model in which one current frame is used as the input data 121 and the number of input frames is one.

For example, the training data can be generated based on a set of data in which an image with a low resolution is used as the input data and an image with the desired resolution generated by applying a known super resolution processing to the input data is used as the ground truth. The training data may also generate based on a set of data in which an image obtained by using a radiation detector capable of obtaining an image with the desired resolution is used as the ground truth and an image generated by reducing the resolution of such an image is used as the input image. Further, the training data may generate based on a set of data in which an image obtained by setting a low resolution as the imaging-condition is used as the input data and an image obtained by setting a high resolution (the desired resolution) as the imaging-condition is used as the ground truth. In a case where the input data includes a plurality of frames, a frame to be processed and a frame obtained prior to the frame can be used as the input data of the training data as in the first embodiment.

An example of a machine learning model used in the inference processing unit 262 according to the third embodiment may be a multi-layer neural network, and, for example, a CNN may be used in at least a part of the multi-layer neural network may be used. Furthermore, a technique relating to an autoencoder may be used in at least a part of the multi-layer neural network. Also, the learned model used by the inference processing unit 262 may be generated using the transfer learning. In this case, for example, the learned model used for the super resolution processing may be generated by performing the transfer learning on a machine learning model which has been trained using the radiation image of the object to be inspected O with a different kind or the like. By performing such transfer learning, it is possible to efficiently generate a learned model for the object to be inspected O, for which it is difficult to obtain much training data. The object to be inspected O with a different kind or the like may be, for example, an animal, a plant, or an object for non-destructive inspection, or the like.

In such a system, for example, as shown in FIG. 8A to FIG. 8C, a plurality of learned models which differ in the number of frames to be input can be prepared, and the system can operate in the flow shown in FIG. 7.

In the controlling unit 20 according to the third embodiment, the image processing can include the super resolution processing to improve the image resolution. According to such a configuration, the super resolution processing unit 116 performs the processing using the learned model, so that the real-time processing to obtain an image with suitably improved resolution can be performed even immediately after the imaging.

In the first to third embodiments, the examples in which the image processing unit 22 applies the noise reduction processing or the super resolution processing to the moving image of the radiation image using a learned model based on the number of frames which have been obtained is described. In contrast, the image processing unit 22 may perform other image processing as the image processing for the moving image of the radiation image using a learned model based on the number of frames which have been obtained. For example, the image processing unit 22 may perform the gradation processing, the emphasis processing, the grid stripe reduction processing, etc., which are performed by the diagnosis image processing unit 27, on the moving image using the learned model.

In this case, the training data may include a set of data in which one or more images before various processing are used as the input data, and one image after the various processing is used as the ground truth. The various processing may be performed by any known methods. The processing may be performed according to the region of interest set in the radiation image. For example, the gradation processing may be performed so that the gradation of the region of interest is wide, and the emphasis processing may be performed so as to emphasize the region of interest. The structure of the learned model may be the same as that of the learned model described in first embodiment. Furthermore, the learned model may also be generated using transfer learning. The image processing unit 22 may perform some of these processes using the learned model and perform other processes as diagnostic image processing, for example, by the rule-based processing.

In this case, as described in the first to third embodiments and shown in FIG. 8A to FIG. 8C, a plurality of learned models which differ in the numbers of frames to be input may be prepared in the inference processing unit 262, and the system may operate in the flow as shown in FIG. 7. In a case where the input data is a plurality of frames, the frame to be processed and a frame obtained prior to the frame may be used as the input data of the training data as in the first embodiment.

Further, the inference processing unit 262 may perform image processing combining the noise reduction processing described in first embodiment, the super resolution processing described in third embodiment, and the diagnostic image processing described above using a learned model. In this case, the training data may include a set of data in which one or more images before various combined image processing are used as the input data, and one image after the various combined image processing is used as the ground truth. Even in this configuration, in a case where the input data is a plurality of frames, the frame to be processed and a frame obtained prior to the frame may be used as the input data of the training data in the same manner as described above. Therefore, the image processing performed by the inference processing unit 262 can include at least one of the noise reduction processing, the super resolution processing, the gradation processing, the emphasis processing, and the grid stripe reduction processing. According to such a configuration, the controlling unit 20 can suitably and in real-time apply the desired image processing to the moving image using the learned model.

(Modification 1)

With regard to the machine learning model used by the inference processing unit 262, any layer configuration such as a variational auto-encoder (VAE), a fully convolutional network (FCN), SegNet, or DenseNet can also be combined and used as the configuration of the CNN. The machine learning model may be configured using, for example, a Vision Transformer (VIT).

(Modification 2)

In addition, the training data of various learned models is not limited to data obtained using the radiation detector that itself performs the actual imaging, and depending on the desired configuration, the training data may be data obtained using a radiation detector of the same model, or data obtained using a radiation detector of the same type or the like. Note that, in the learned models according to the embodiments and modifications described in the above, for example, it is conceivable for the magnitude of luminance values of a radiation image, as well as the order and slope, positions, distribution, and continuity of bright sections and dark sections and the like of a radiation image to be extracted as a part of the feature amount and to be used for inference processing pertaining to generation of a radiation image on which the various image processing is performed.

The learned model for the embodiments and modifications described above can be provided in the controlling unit 20. These learned models, for example, may be constituted by a software module executed by a processor such as a CPU, an MPU, a GPU, an FPGA, or the like, or may be constituted by a circuit that serves a specific function such as an ASIC. These learned models may be provided in an apparatus of another server or the like connected to the controlling unit 20. In this case, the controlling unit 20 can use the learned model by connecting to the server or the like that includes the learned model through any network such as the Internet. The server that includes the learned model may be, for example, a cloud server, a fog server, an edge server, or the like.

(Modification 3)

In the embodiments and modifications described above, the radiation detector 10 is an indirect conversion type detector that converts radiation into visible light by using scintillator 11 and converts the visible light into an electrical signal by using a photoelectric conversion element. On the other hand, the radiation detector 10 may be a direct conversion type detector that directly converts an incident radiation into an electrical signal.

According to one embodiment of the present disclosure, image processing can be applied to a moving image suitably and in real-time even immediately after imaging.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In this case, the processor or circuit may include a central processing unit (CPU), a microprocessing unit (MPU), a graphics processing unit (GPU), an application specific integrated circuit (ASIC), or a field programmable gateway (FPGA). Further, the processor or circuit may include a digital signal processor (DSP), a data flow processor (DFP) or a neural processing unit (NPU).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-85338, filed May 24, 2023, which is hereby incorporated by reference herein in its entirety.

What is claimed is:

1. An image processing apparatus configured to apply image processing to a moving image including a plurality of frames of radiation images, the image processing apparatus comprising:

at least one processor; and a memory coupled to the at least one processor, the memory having instructions that, when executed by the processor, causes the at least one processor to select a learned model used for the image processing of a frame to be processed from among a plurality of learned models which differ in the number of frames to be input, based on the number of frames which have been obtained since imaging of the moving image was started; and perform inference processing using the selected learned model in the image processing of the frame to be processed.

2. The image processing apparatus according to claim 1, wherein the plurality of learned models includes a learned model of which the number of frames to be input is one and a learned model of which the number of frames to be input is greater than one.

3. The image processing apparatus according to claim 1, wherein the instructions when executed cause the at least one processor to input, based on the number of frames to be input of the selected learned model, one first frame which is the frame to be processed and zero or more second frames obtained prior to the first frame into the selected learned model to infer an image obtained by applying the image processing to the first frame.

4. The image processing apparatus according to claim 1, wherein the instructions when executed cause the at least one processor to select, from among the plurality of learned models based on the number of frames which have been obtained, a learned model of which the number of frames to be input is equal to or less than the number of frames which have been obtained, and of which the number of frames to be input is larger than other learned models of which the number of frames to be input is equal to or less than the number of frames which have been obtained.

5. The image processing apparatus according to claim 1, wherein each of the plurality of learned models is obtained using a training data including images corresponding to the number of frames to be input and an image obtained by performing the image processing on an image to be processed among the images.

6. The image processing apparatus according to claim 1, wherein the image processing comprises at least one of noise reduction processing in which noise in an image is reduced, a super resolution processing in which the resolution of an image is improved, a gradation processing in which the gradation of an image is adjusted, an emphasis processing in which a specific pixel in an image is emphasized, and a grid stripe reduction processing in which grid stripe in an image is reduced.

7. The image processing apparatus according to claim 1, wherein:

the plurality of learned models includes a group of learned models according to an imaging mode; and the instructions when executed cause the at least one processor to select, from the group of learned models corresponding to an imaging mode of the moving image to be processed, the learned model used for the image processing of the frame to be processed based on the number of frames which have been obtained.

8. The image processing apparatus according to claim 7, wherein the imaging mode is set based on at least one of the sensitivity of a detector used for imaging, a bias voltage, noise characteristics, an amplification factor at readout, a frame rate, image size, accumulation time at signal reception, and imaging technique.

9. The image processing apparatus according to claim 7, wherein the instructions when executed cause the at least one processor to exclude the number of frames obtained in an imaging mode different from the imaging mode of the moving image to be processed from the number of frames which have been obtained.

10. The image processing apparatus according to claim 7, wherein the instructions when executed cause the at least one processor to include the number of frames obtained in a first imaging at a predetermined imaging mode to the number of frames which have been obtained, in a second imaging at the predetermined imaging mode performed after the first imaging.

11. A radiation imaging system, including:

the image processing apparatus according to claim 1; and a radiation detecting apparatus for detecting radiation irradiated by a radiation generating apparatus.

12. A method of operating an image processing apparatus configured to apply image processing to a moving image including a plurality of frames of radiation images, the method comprising:

selecting a learned model to be used for the image processing of a frame to be processed from among a plurality of learned models which differ in the number of frames to be input based on the number of frames which have been obtained since imaging of the moving image was started; and performing inference processing using the selected learned model in the image processing of the frame to be processed.

13. A non-transitory computer-readable storage medium having stored thereon a program, for causing, when executed by a computer, the computer to execute the method of operation according to claim 12.

* * * * *